(12) United States Patent
Varley

(10) Patent No.: US 12,038,981 B2
(45) Date of Patent: Jul. 16, 2024

(54) KNOWLEDGE GRAPH FOR INFORMATION RETRIEVAL AND EXPLORATION

(71) Applicant: salesforce.com, inc., San Francisco, CA (US)

(72) Inventor: Ian Varley, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 236 days.

(21) Appl. No.: 17/516,625

(22) Filed: Nov. 1, 2021

(65) Prior Publication Data

US 2023/0138151 A1 May 4, 2023

(51) Int. Cl.
*G06F 16/90* (2019.01)
*G06F 16/901* (2019.01)
*G06F 16/906* (2019.01)

(52) U.S. Cl.
CPC ........ *G06F 16/906* (2019.01); *G06F 16/9024* (2019.01)

(58) Field of Classification Search
CPC ............................ G06F 16/906; G06F 16/9024
See application file for complete search history.

(56) References Cited

U.S. PATENT DOCUMENTS

| | | | |
|---|---|---|---|
| 7,644,052 B1 * | 1/2010 | Chang .................... | G06N 5/022 706/45 |
| 2015/0142736 A1 | 5/2015 | Bruce et al. | |
| 2016/0306837 A1 | 10/2016 | Varley et al. | |
| 2018/0253357 A1 | 9/2018 | Varley et al. | |
| 2019/0384895 A1 * | 12/2019 | Jin ....................... | G06F 21/6245 |
| 2020/0097205 A1 * | 3/2020 | Fanghaenel ........... | G06F 3/0671 |

OTHER PUBLICATIONS

Document management system—Wikipedia; https://en.wikipedia.org/wiki/Document_management_system, Oct. 4, 2021.
Wiki software—Wikipedia; https://en.wikipedia.org/wiki/Wiki_software, Oct. 28, 2021.

* cited by examiner

*Primary Examiner* — Kristopher Andersen
(74) *Attorney, Agent, or Firm* — Kowert, Hood, Munyon, Rankin & Goetzel, P.C.; Mark D. Seegers; Dean M. Munyon

(57) ABSTRACT

An application for creating an editing a knowledge graph for document retrieval and exploration. The application may create a data structure, arranged as a directed acyclic graph (DAG), based on user input indicative of categories within a taxonomy and documents within an information repository. The DAG may have a top-level node, interior nodes, and leaf nodes. Interior nodes correspond to taxonomic classifications and point to other interior nodes or leaf nodes. Leaf nodes have corresponding interior nodes and include links to one or more documents in the information repository. The application permits editing of nodes, but does so in a way that preserves links to the arrangement of nodes prior to the editing. The application also permits traversal of nodes of the data structure via a user interface in which a representation of a given node includes an indication of one or more possible paths for reaching the given node.

20 Claims, 15 Drawing Sheets

```
                                    ┌─ 900
┌─────────────────────────────────────┐
│ Create, by an application executing on a computer │
│ system, a data structure, including receiving user │
│ input indicative of (a) taxonomic classifications and │
│ (b) documents within an information repository │
│                    905              │
└─────────────────────────────────────┘
                    │
                    ▼
┌─────────────────────────────────────┐
│ Create, by an application executing on a computer │
│ system, a data structure, where creating includes │
│ creating also includes: arranging the data structure │
│ as a directed acyclic graph (DAG) having a top-level │
│ node, a plurality of interior nodes, and a plurality of │
│ leaf nodes, where interior nodes of the plurality of │
│ interior nodes correspond to ones of the taxonomic │
│ classifications and point to other interior nodes or │
│ leaf nodes, and where leaf nodes of the plurality of │
│ leaf nodes are child nodes of corresponding interior │
│ nodes and include links to one or more documents │
│ in the information repository │
│                    910              │
└─────────────────────────────────────┘
                    │
                    ▼
┌─────────────────────────────────────┐
│ Edit, by the application in response to user input, │
│ nodes in the data structure such that links to the │
│ data structure │
│                    920              │
└─────────────────────────────────────┘
```

750 →

```
Q  Atlas – Architectural Documentation

Network Security — 762

Top >> Security >> Infrastructure — 764A
Top >> Infrastructure >> Network — 764B We have a variety of technologies and policies with which to secure our network. — 766

Overall
  • Getting In The Zone, Architecture Strategy, May 2018 — 768
                                                            Leaf Node Link
```

Atlas – Architectural Documentation

Getting In The Zone • Architecture Strategy, May 2018 — 772

Top >> Security >> Infrastructure — 774A
Top >> Infrastructure >> Network — 774B Link: Doc — 776

Date: May 2018 — 778

Type: Article — 780

Collection: Architecture Strategy — 782
Summary: An overview of the CRM Core network security model
Author: David Murray — 784
TL:DR: we're moving towards more open networks — 786

```
┌─────────────────────────────────────┐
│ Accessing a data structure arranged │
│ as a directed acyclic graph (DAG)   │
│ that includes a top-level node,     │
│ a plurality of interior nodes, and  │
│ a plurality of leaf nodes, wherein  │
│ interior nodes of the plurality of  │
│ interior nodes correspond to a      │
│ category within a taxonomic         │
│ hierarchy and point to other        │
│ interior nodes or leaf nodes, and   │
│ wherein leaf nodes of the plurality │
│ of leaf nodes have corresponding    │
│ parent interior nodes and include   │
│ links to one or more artifacts in   │
│ an information repository           │
│ 950                                 │
└─────────────────────────────────────┘
                   │
                   ▼
┌─────────────────────────────────────┐
│ In response to user input           │
│ indicative of addition of an        │
│ additional parent node for a        │
│ particular node within the          │
│ taxonomic hierarchy of the DAG,     │
│ creating an additional path for the │
│ particular node while preserving    │
│ an existing path for the particular │
│ node                                │
│ 960                                 │
└─────────────────────────────────────┘
```

FIG. 9B

KNOWLEDGE GRAPH FOR INFORMATION RETRIEVAL AND EXPLORATION

BACKGROUND

Technical Field

This disclosure is related to the organization of information, and more particularly, to data structures for organizing information into one or more taxonomies in a format that promotes retrieval and exploration.

Description of the Related Art

There are a vast number of electronic documents available today. Even within a particular organization (e.g., a company), significant amounts of documentation may exist. The generation of such documents may occur through various channels. For example, documents may be generated for use internal to an organization, for presentation at conferences, sales announcements, and so on. Moreover, such documents may be stored in various places within an organization.

Search engines may be of some use in locating specific documents, but in many cases, documents may reside in different information silos (and thus cannot be searched in a unified manner). But even a typical unified search interface of a number of different locations does not provide the user a cohesive view of documents pertaining to a given topic. For example, this type of interface does not allow the user to explore a group of documents using an interface that describes a hierarchical relationship of documents to one another.

BRIEF DESCRIPTION OF THE DRAWINGS

The following detailed description makes reference to the accompanying drawings, which are now briefly described.

FIGS. 7A-D are example screenshots depicting traversal of different types of nodes within one embodiment of a data structure.

FIG. 9B is a flow diagram illustrating another embodiment of a method for creating and editing a graph structure.

DETAILED DESCRIPTION OF EMBODIMENTS

Figure 1A:
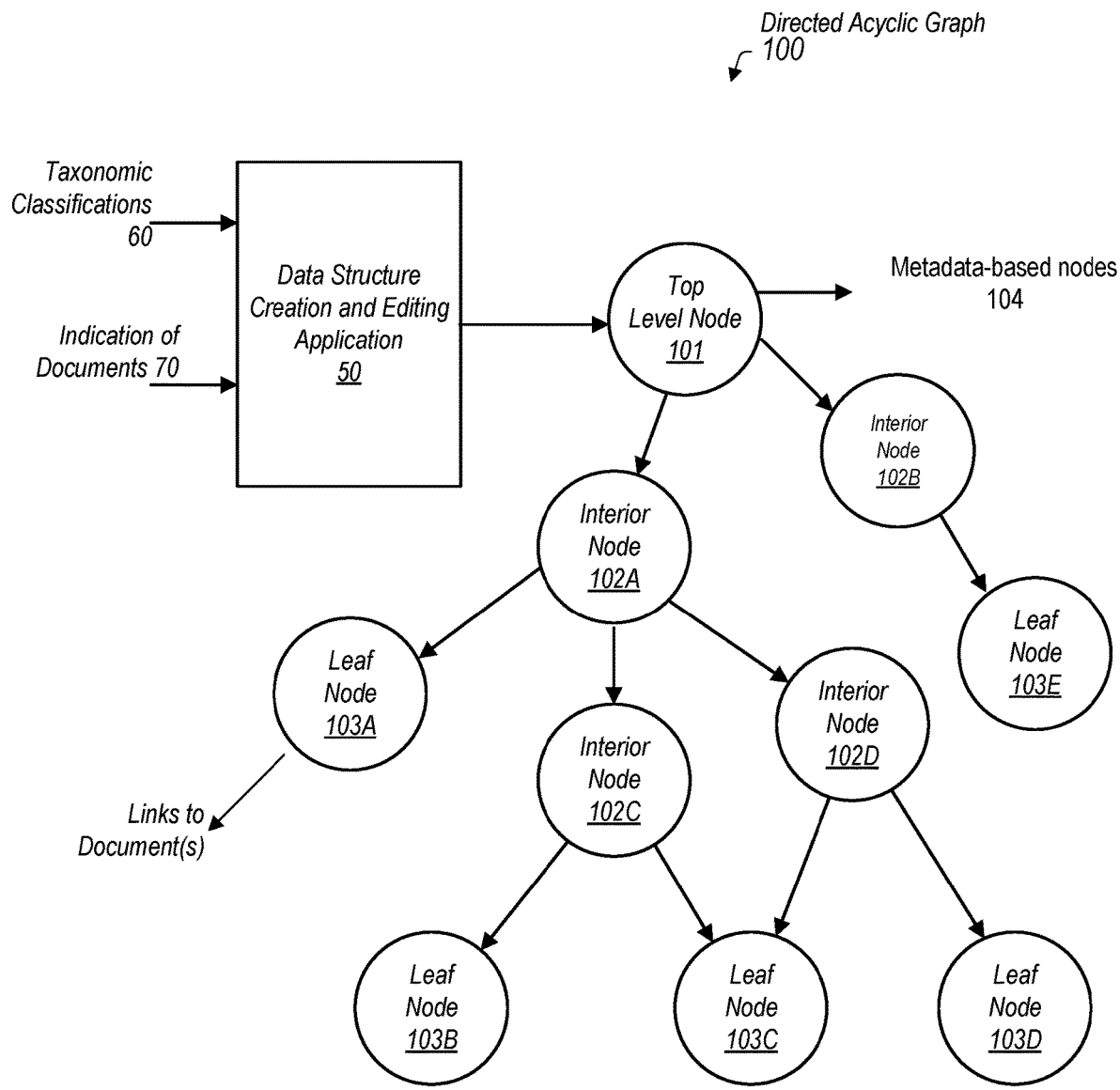
FIG. 1A is a diagram illustrating one embodiment of a data structure generated by an application executing on a computer system.

The present disclosure is directed to a knowledge graph structure for electronic file retrieval and exploration. The techniques of the present disclosure are applicable in any number of settings, including document retrieval and exploration. (These techniques are equally applicable to any type of electronic files, such as those that contain audio, video, or images.) Large organizations may, during the normal course of business, produce a large number of documents, such as those related to a particular software product. Such documents may be scattered across a number of different repositories, and may lack any consistent findability or stated relationship to one another. These issues maybe compounded by the fact that that organizations may have a number of geographically disparate locations and a number of different places to store information.

Some problems, such as findability, may be solved by search tools that enable a search across the organization and its various information repositories. The various documents may have relationships with one another that are not evident through search interfaces. For example, documents may be related in numerous ways, including subject matter, time/date/locations of production or presentation, authors, internal organization from which the documents were produced, and so on. Without knowledge of these relationships, the ability to find related documents is impaired.

The present disclosure is directed to a knowledge graph structure in which the relationships may be expressed for a large number of documents stored across a number of different tools, servers, locations, etc. As used herein, a "knowledge graph" refers to a data structure that indicates relationships between entities using nodes and edges. In some embodiments, the graph structure is based on a directed acyclic graph (DAG). A DAG is a type of graph that, as its name suggests, is both directed and acyclic. A graph is considered acyclic when it has no cycles, which means that there is no single path through the graph in which the same node is encountered more than once. A directed graph means that edges have direction. Thus, an edge between nodes A and B is directed if it allows a flow from A to B, or B to A, but not in both directions. Accordingly, a graph in which edges have directions, and in which a given node does not connect to other nodes earlier in the given node's path, is a DAG. In the various examples given in this disclosure, it can be seen that the edges in the graphs are directed downward, starting from the top-level node, passing through "first-level" interior nodes (those nodes that are child nodes of the top-level node), and terminating in either an interior node or a leaf node.

The present disclosure contemplates a DAG that is usable to depict relationships between items such as documents. In some embodiment, the DAG may include a top-level node, a number of interior nodes, and a number of leaf nodes. Broadly speaking, interior nodes correspond to portions of a taxonomy, while leaf nodes correspond to items or documents associated with a given interior node. The top-level node acts as entry point into the DAG. The DAGs contemplated herein permit multiple different taxonomies to exist simultaneously for a given set of items/documents, such that certain interior or leaf nodes may be reached via multiple different paths through the graph, where the paths are associated with different taxonomies. Accordingly, in some embodiments, the top-level node may provide a user different entry points into a set of documents/items to be traversed (e.g., by linking to different taxonomies, each of which has a different arrangement of interior nodes). The top-level node may also include pointers to a plurality of metadata-based nodes. The metadata-based nodes are generated automatically from metadata (e.g., type, author, etc.) about the files linked in interior nodes and corresponding leaf nodes of the data structure. Examples of metadata-based nodes may include sets of documents organized by author, year of publication, conference proceeding, etc.

The interior nodes correspond to various taxonomic classifications. The interior nodes can point to other interior nodes and/or leaf nodes. Each of the leaf nodes includes links to one or more documents, and is a child node of one or more interior nodes. (In some embodiments, a single leaf node links either to a single document or different versions of the same document.) For example, in a taxonomy of games, a first interior node might correspond to board games, while a second interior node might correspond to card games. The second interior node might in turn point to separate interior nodes for one-player, two-player, and four-player card games. The interior node for four-player card games may include links to leaf nodes corresponding to games such as Bridge and Spades. The leaf nodes may either include further information about these games or include links to some information repository where the documents/items about the subject of the leaf nodes is located.

There are various approaches to capturing unstructured information in document repositories, including wiki software, folder-based document storage, etc. The present inventor has recognized, however, the need for a tool that allows for creation and editing of knowledge graphs specifically dedicated to taxonomic hierarchies. More particularly, the present inventor has recognized the desirability of a tool with certain properties. These properties include enforcing the type of nodes that may be added by a user ("type enforcement"), preserving links to nodes once added to the graph ("permanence"), facilitating the addition of multiple taxonomies for given set of leaf nodes ("pluralism"), and promoting the exploration of information referenced by the graph ("discoverability"). Some or all of these properties may be found in various embodiments contemplated by the present disclosure. For example, the tool, in various embodiments, may make documents contextually connected (by enforcing a regime in which the documents have to specified at a particular location within a taxonomy) and easily discoverable (e.g., through attributes such as authorship).

In embodiments exhibiting type enforcement, nodes added by the user at certain locations in the graph are guaranteed to be either interior or leaf nodes. This property can be enforced by the application that allows the DAG to be created and edited. For example, type enforcement, may prevent the user from adding a node to the data structure as a descendent node of a first-level interior node unless that node is either an interior node or a leaf node.

In embodiments exhibiting node permanence, the application that is used to create and edit a DAG having interior and leaf nodes as described above may be "accretive" in that, once interior or leaf nodes are added to the graph, links to those nodes are preserved (although content might be superseded by newer versions, or recontextualized in view of subsequent information). In this manner, the DAG can act in part like an immutable ledger for documents or other items being classified. Thus, links to some nodes in the data structure may be considered to be more or less permanent, in that those links will always point to the same interior or leaf node regardless of subsequent editing. The application can thus ensure that links to such nodes are not affected by editing. (Of course, the notion of "permanence" is not intended to be absolute, as a DAG can be deleted, either accidentally or purposefully, in its entirety at some point in time. Here, permanence of nodes and links is intended to mean that while the DAG exists, links to nodes, once created, will remain valid.) The application permits revising a taxonomy in a number of ways, including joining two nodes into a single node, and splitting a single node into two nodes. In some cases, nodes may be deleted. As will be described below, such edits may be performed while preserving links to the affected nodes.

In embodiments exhibiting pluralism, users that are able to edit the graph need not agree on a single taxonomy—the DAG permits users to each classify items with other taxonomies. As a result, multiple traversal paths may be available to locate a given item. As one example, a document about computer network security might be reached by two paths: one that includes security→infrastructure and another that includes infrastructure→network. Accordingly, a leaf node containing a link to such a document may have at least two different traversal paths in which it can be reached from the top-level node. Multiple paths may thus be added (sometimes by different users) without disturbing the arrangement of current taxonomies.

In embodiments exhibiting node discoverability, the DAG created by the application permits traversal of the nodes of the data structure via a user interface. The user interface may be presented via the application that created the graph, or via a web browser. In such embodiments, no matter what node in the graph a user first navigates to, the interface may facilitate further exploration. For example, nodes in the graph may include "breadcrumbs" that show you where you are in a graph. For example, if a user is given a link to a network security document, that page may show at least one path for reaching that document. If that path shows "infrastructure→network," the user may be able to select the "infrastructure" portion of the path, which causes navigation to the infrastructure node and allows discovery of various documents related to that topic.

DAG

FIG. 1A is a diagram illustrating one embodiment of a DAG generated by an application executing on a computer system. In the embodiment shown, a knowledge graph creation and editing application 50 is used to create directed acyclic graph (DAG) 100. The application 50 may receive as input taxonomic classifications and indications of documents (or, more generally, electronic files). Metadata may also be included.

The user input to application 50 thus includes an indication of the taxonomic classifications that are to be included within DAG 100, as well as links to the documents that correspond to these classifications. As will be described, application 50 may accept user input to create a node in DAG 100 corresponding to a particular taxonomic classification (e.g., "add node for 'security'"), as well as to specify particular relationships between classifications (e.g., "add 'security' as child node of 'network'"). These types of nodes in DAG 100 are known as "interior nodes." Similarly, application 50 may accept user input indicative of "leaf nodes." Leaf nodes are child nodes of one or more interior nodes, and include links to document(s) or file(s) that pertain to the one or more interior nodes. In some embodiments, leaf nodes are called such because they do not have child nodes in DAG 100. Application 50 may thus receive, for a document/file corresponding to a particular leaf node, metadata and a link to the document/file, and use this information to create the leaf node. The link may specify where the document/file is within the information repository. The information repository may be any suitable storage system, including cloud storage or any central or distributed server system. An "information repository," as used herein, may refer to separate physical repositories. Thus, different data stores within a large corporation that are geographically disparate can be referred to as a single "information repository" for purposes of the present disclosure. In general, regardless of the location of the linked documents/files for a given DAG created by application 50, the various locations these documents/files may be collectively referred to as being located in an "information repository."

The output of application 50 as a result of the creation process is DAG 100, which includes a top-level node 101, a number of interior nodes 102, and a number of leaf nodes 103, a number of metadata-based nodes 104.

In addition to helping a user locate a particular document in the information repository, DAG 100 may facilitate exploration of related documents because DAG 100 stores information indicative of relationships between the various documents. Thus, when navigating to a particular document linked to by DAG 100, a user may be able to view path information that indicates where the document resides within one or more taxonomies. Portions of the path information may be selectable to navigate to other interior nodes, and from there to corresponding leaf nodes, allowing the user to explore related documents. These documents may thus be more discoverable than without DAG 100, particularly since they may be distributed over a number of different servers, locations, and so on, without any underlying organization.

To ensure DAG 100 is usable as described, application 50 may enforce a structure of DAG 100 in which nodes in the data structure added by the user at certain points in the graph (e.g., nodes that descend from first-level interior nodes) are interior nodes or leaf nodes. Furthermore, application 50 may also ensure that interior or leaf nodes satisfy some established format for these nodes. This format may vary by implementation of application 50. For example, different implementations of application 50 may require different types of metadata for documents linked to in leaf nodes.

Top-level node 101 in the embodiment shown is a point of entry into DAG 100. Top-level node 101 is not a user-created node; rather, it is created by application 50 upon creation of a new DAG. Top-level node 101 may also point to various metadata-based nodes 104.

Top-level node 101 may also point to one or more interior nodes 102. Although only two interior nodes 102 (102A and 102B) are shown as connected to top-level node 101 in FIG. 1A, the disclosure is not limited in this manner. Interior nodes 102A and 102B are considered first-level interior nodes, in contrast to lower-level interior nodes such as 102C and 102D. As explained, first-level interior nodes have top-level node 101 as a parent node. On the contrary, any number of interior nodes 102 may be pointed to by top-level node 101. The interior nodes 102 in the embodiment shown correspond to taxonomic classifications. Additional interior nodes 102 may also be child nodes of other interior nodes 102 (e.g., nodes 102C and 102D are child nodes of parent node 102A). A child interior node 102 of a parent interior node 102 thus corresponds to a taxonomic sub-classification of the parent node. Leaf nodes 103 are child nodes of one or more interior nodes. For example, leaf nodes 103A and 103E are child nodes of interior nodes 102A and 102B, respectively. Leaf node 103C has two parent interior nodes (102C and 102D), while other leaf nodes such as 103B and 103D, each have one parent interior node.

Leaf nodes define end points of DAG 100, in that no traversal to a lower level of the graph structure is possible. In some embodiments, leaf nodes 103 include links to one or more documents that fall under the taxonomic classification(s) of the parent interior node(s) 102. (As previously noted, some leaf nodes 103 may have multiple parent interior nodes 102, as the documents linked therein may fall under multiple classifications). Leaf nodes 103 may also include metadata defining various types of properties of the linked documents. Examples of metadata include document author(s), dates of publication, events at which a published version of the document may be been presented, and so on. More detail regarding the format of a leaf node is described below with respect to FIG. 6.

Thus, DAG 100 according to this disclosure thus may describe a multi-level hierarchical structure with various levels of taxonomic classification, to which documents linked in the leaf nodes 103 may be assigned. In one example of a multi-level hierarchy, DAG 100 is directed to games of various types. A first-level interior node 102 coupled to the top-level node 101 may correspond to card games, while another first-level interior node 102 may correspond to board games. Under first-level interior node 102 for card games, there may be a number of second-level interior nodes 102 that correspond to, e.g., one-player games, two-player games, four-player games, and so on. Connected to these second-level interior nodes 102 may be a number of leaf nodes 103. These leaf nodes 103 may contain links to documents pertaining to their parent interior nodes. For example, these documents may outline the rules for the corresponding types of games. Thus, a first leaf node 103 may contain links to documents outlining rules for one-player games, a second leaf node 103 may contain links to documents outlining rules for two-player games, and a third leaf node may contain links to documents outlining rules for four-player games. It has been noted that some of these leaf nodes 103 may be connected to more than one interior node 102. Thus, a leaf node 103 containing links to documented rules for a card game that can be played by either two or four players may have connections to different interior nodes 102 corresponding to those taxonomic classifications.

Similarly, the first-level interior node 102 corresponding to board games may have one or more further levels of child interior nodes 102 (e.g., corresponding to word games, trivia games, etc.), as well as associated leaf nodes 103.

Note that the taxonomy defined by interior nodes 102 in the above example is independent of the games defined by leaf nodes 103. An initial creator of DAG 100 may thus choose to define only interior nodes 102, leaving other users in a community to add leaf nodes 103 to the previously defined taxonomy. Still further, after some number of leaf nodes 103 have been added to DAG 100, another use may wish to create another gaming taxonomy for existing games in the data structure (e.g., this taxonomy may group games by age-level appropriateness). One advantage of DAG 100 is that this second taxonomy may be created without disturbing either the first taxonomy or the existing leaf nodes. Accordingly, the game Go Fish may have been previously defined in the first taxonomy as having parent interior nodes for at least two, three and four-player card games; in the second taxonomy, Go Fish may be defined to have a parent interior node for a new "All Ages" interior node.

A user of the DAG 100 may find documents by traversing the structure. In some embodiments, a user may traverse DAG 100 either by using application 50 or by using another user interface, such as a browser if the nodes of DAG 100 are encoded in a markup language. A user may start at top-level node 101 and navigate to an interior node 102 as desired. If there are additional interior nodes 102, a user may navigate to those as well by selecting a desired classification. This may continue until the user reaches a leaf node 103. The user can then access the desired document(s). In other instances, a user may receive a link to some specific node within DAG 100 and utilize that link to navigate directly to the specific node without traversing DAG 100 from the top-level node.

To aid in navigation and traversal through DAG 100, the various ones of interior nodes 102 and leaf nodes 103 may include information indicating interrelationships with other nodes. This information may include an indication of one or more paths to the given node. Each path indication indicates a series of interior nodes that may be traversed to reach the given node. Furthermore, each interior node within a path indication may be a selectable link that enables a user to navigate to that interior node. This facilitates exploration within a given taxonomy. Also, each node may include links to each of its child nodes. Screenshots of sample nodes of DAG 100 are described below with reference to FIGS. 7A-D.

As will be described, application 50 used to create DAG 100 may include a number of additional features that permit the user to modify the interior and leaf nodes in the graph. In some embodiments, these operations may be performed according to set of conditions that maintain the integrity of the graph. Examples of these conditions include: no nodes within the graph can be orphaned (meaning that a node cannot be edited such they are now unreachable from the top-level node); no cycles can be created (which would mean that the graph is no longer a DAG). Additionally, when a new parent node is created for a particular node, the particular node and all descendent children of the particular node (if any) are updated with the proper path information. Still further, all metadata-based nodes are automatically generated and updated in response to any graph edits.

One design criterion for DAG 100 noted above is link permanence. Thus, once nodes are added, in some implementations, links to these nodes remain valid even when various node edits are made to the graph. FIGS. 2-5 described below discuss various types of edits, and how these edits may be made to keep node links valid once a new graph node is established.

Figure 1B:
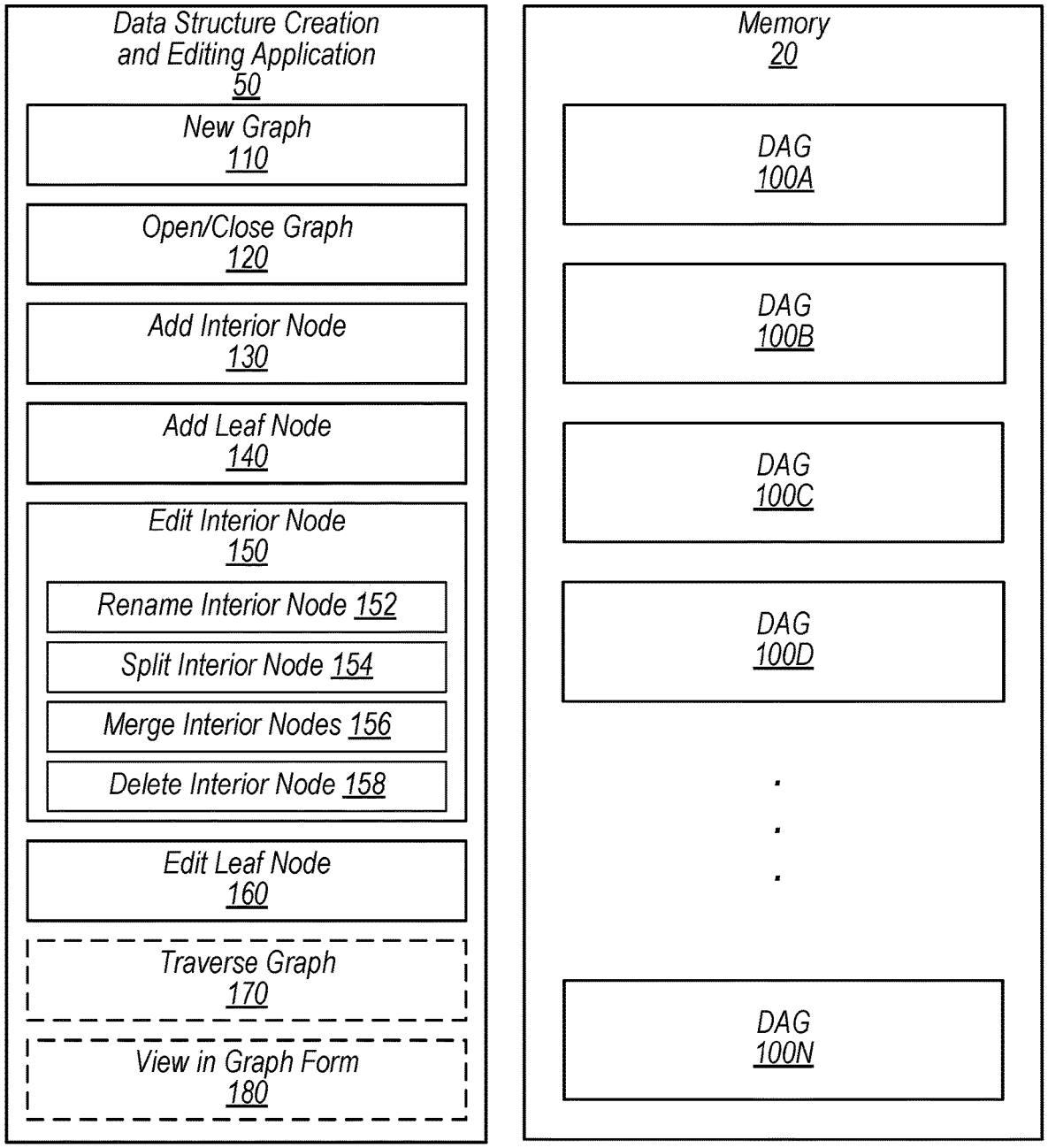
FIG. 1B is illustrating one embodiment of a block diagram of an application for creating and editing a graph data structure.

FIG. 1B is a block diagram illustrating one implementation of application 50. Generally speaking, application 50 is executable to create and edit a DAG 100. In some embodiments, application 50 may also be used to traverse DAG 100 and view it in graph form. As shown, the data that defines a particular DAG 100 is stored in a memory 20 that is accessible to application 50.

FIG. 1B depicts application 50 as having various modules. As used herein, a "module" refers to software that is executable to perform a specified set of operations. The functionality shown in FIG. 1B is just one example of a possible implementation of application 50. A greater or lesser amount of functionality may be included in other embodiments. There may be other modules not shown in FIG. 1B for convenience. For example, application 50 may have a "main" module that displays a user interface, receives user input, and then invokes the appropriate module(s) shown in FIG. 1B based on the user input.

New graph module 110 allows a user to create a new DAG 100. In various embodiments, application 50 may create and edit any number of DAGs (e.g., DAGs 100A-N shown in FIG. 1B), each of which may deal with a different universe of items. Module 110 would thus be invoked by a user to create a new data structure and perhaps provide basic information, such as a unique name to identify the data structure, as well as perhaps some specific structures or parameters that would govern subsequent user interactions (e.g., passwords for control of certain functionality).

Once a particular DAG has been created, open/close module 120 may be invoked in order to select that DAG for access. Thus, a first user may create a particular DAG 100, and then multiple other users may use module 120 to access that DAG in order to add or edit content. Thus, whatever DAG is selected by module 120 will be operated on by subsequent commands. Module 120 may also be used to close a particular DAG.

When a DAG stored in memory 20 has been opened using module 120, a user may add interior and leaf nodes using modules 130 and 140. These modules can add nodes to DAG 100 based on user-supplied data, such as metadata and links. The functionality of modules 130 and 140 is discussed in more depth with respect to FIG. 2. Exemplary formats for interior and leaf nodes are discussed with respect to FIG. 6. Note that the node creation performed by these modules may also entail creating and updating metadata-based nodes 104. For example, when a new leaf node 103 is created that points to a particular author, add leaf node module 140 may cause the metadata-based node for the particular author to be updated.

Once interior and leaf nodes have been created for a particular DAG, modules 150 and 160 may be used to edit interior and leaf nodes, respectively. In general, modules 150 and 160 are executable to permit a user to change metadata and links for interior and leaf nodes. For example, a user may, via module 150, change a filename that stores content for a particular interior node, change a link to a document for a particular leaf node, etc. Similarly, modules 150 and 160 may permit a user to effectuate changes in a structure of DAG 100. For example, modules 150 and 160 may be used to change the parent node of a particular interior or leaf node, respectively.

Figure 3:
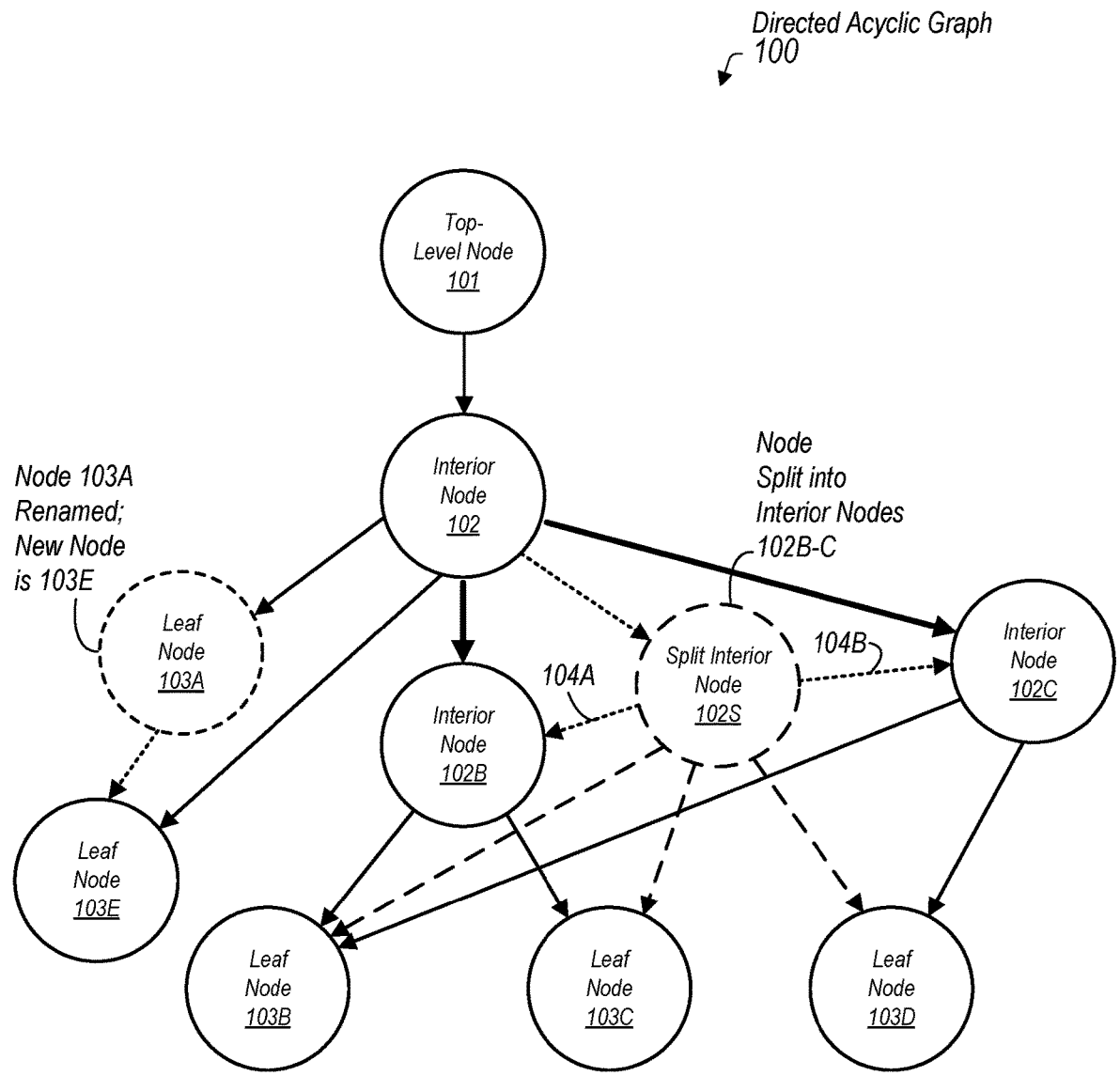
FIG. 3 is a diagram illustrating one embodiment of splitting interior nodes within a data structure into separate nodes.
Figure 4:
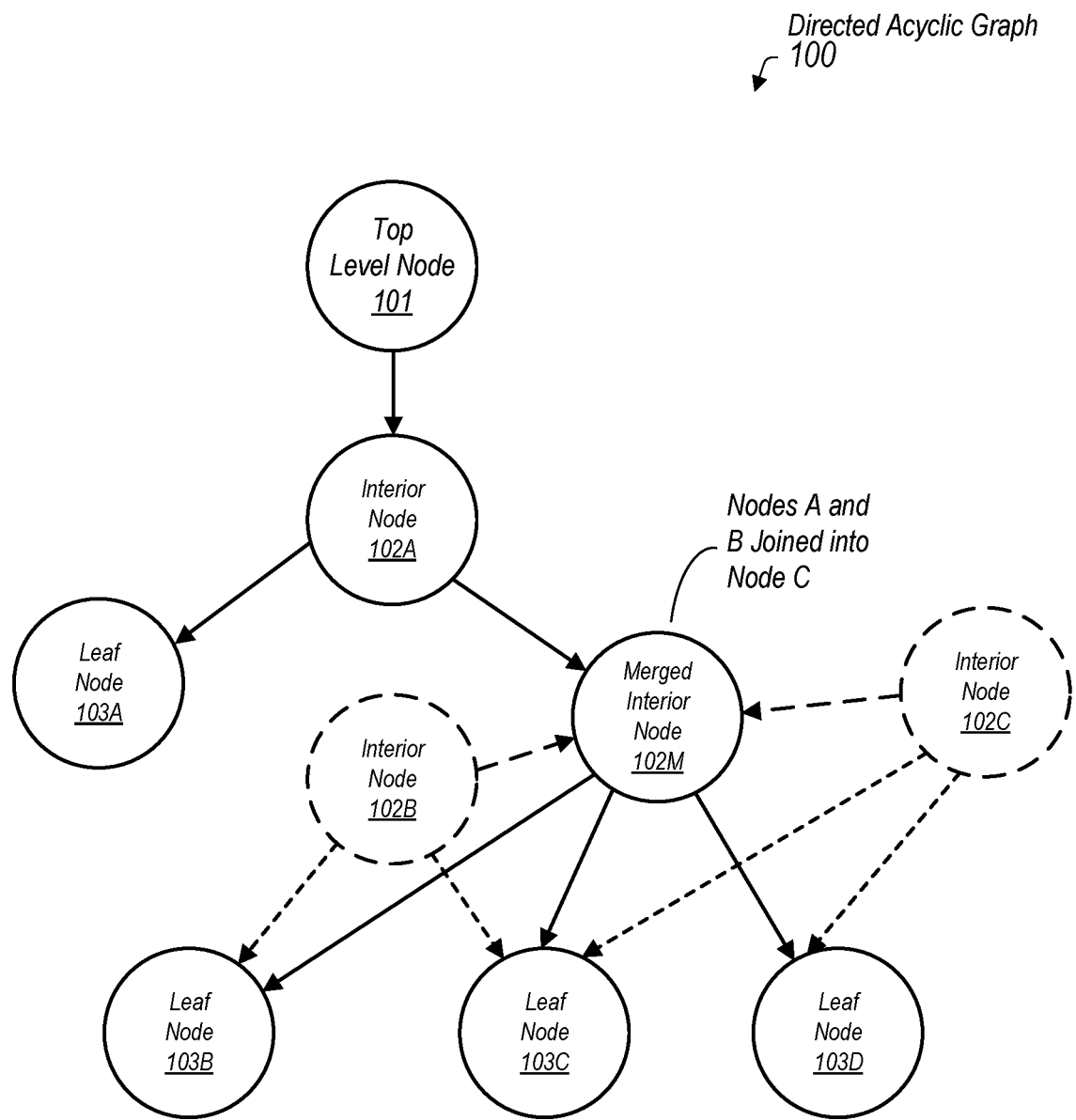
FIG. 4 is a diagram illustrating one embodiment of merging nodes in a data structure into a single node.
Figure 5:
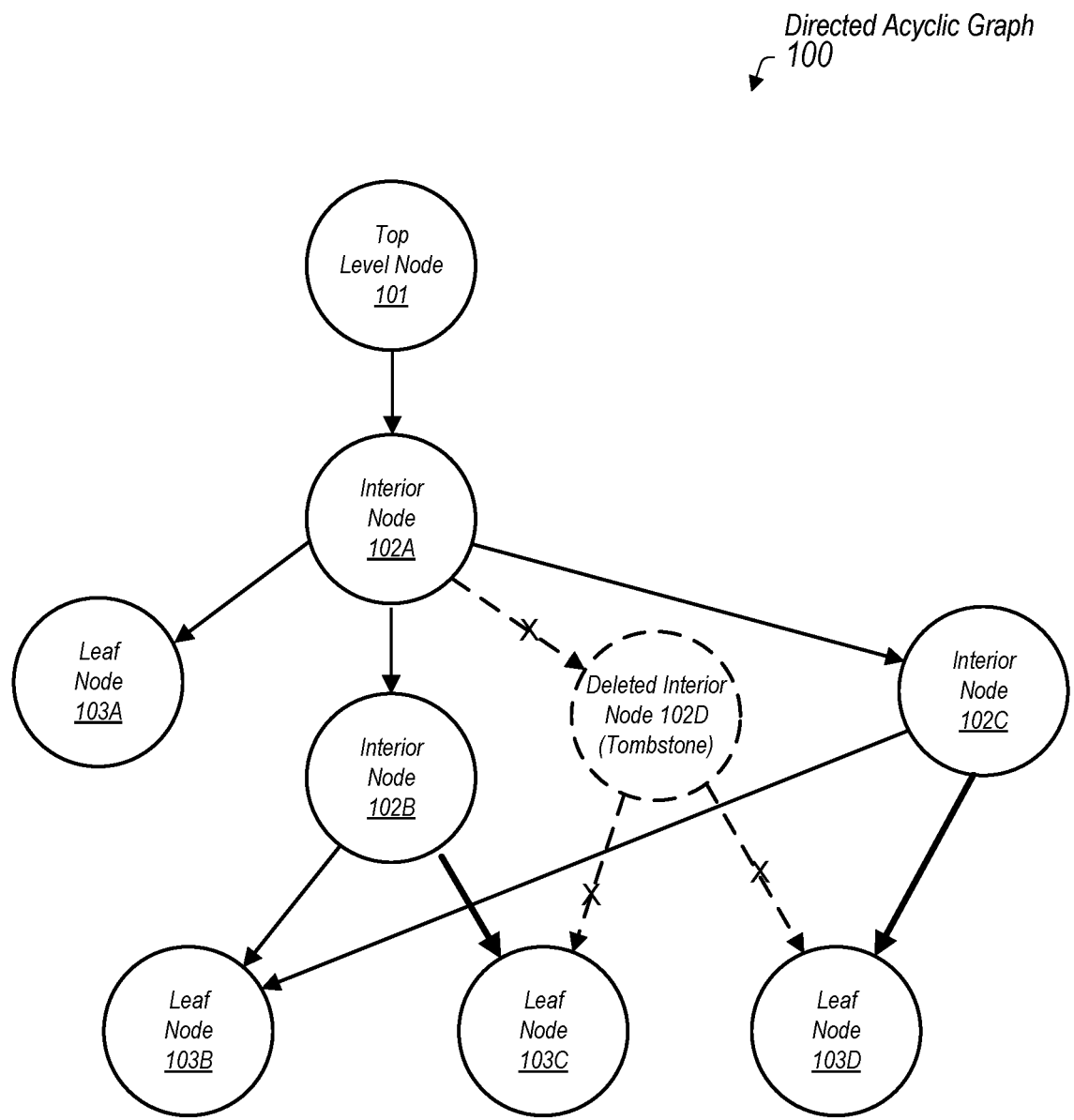
FIG. 5 is a diagram illustrating one embodiment of deleting a node within a data structure.

Various sub-modules of edit interior node module 150 are contemplated. Examples of these sub-modules include 152 (rename; described further with respect to FIG. 3), 154 (split; FIG. 3), 156 (merge; FIG. 4), and 158 (delete; FIG. 5). In some embodiments, these modules are executable to preserve links to nodes created by modules 130 and 140. That is, modules 150 and 160 may operate such that the links to nodes in DAG 100 that exist prior to a given edit are preserved after the edit is made. In one embodiment, there might be a special mode for application 50 that allows nodes to initially be freely created and edited before link preservation is enforced. This would allow a user to initially set up a "skeleton" of interior nodes in a newly created DAG 100. After an initial taxonomy is set up, further edits may be made by the general community of users such that link preservation is performed.

In some implementations, application 50 may be used not only to create and edit DAG 100, but also to traverse it. Thus, application 50 may include traverse graph module 170. This module may be used, for example, to check what the graph looks like after editing. The module may also be used to explore the content of DAG 100 (i.e., as a consumer rather than as a creator). Note that in some embodiments, the content of DAG 100 may also be accessed via a browser program.

In a similar vein, in some implementations, application 50 may be used to view DAG 100 in a special mode in which DAG 100 is shown in graphical form, with nodes and edges such as in FIG. 1. This functionality, which may be performed by view in graph form module 180, may allow a user to better visualize the connections specified by a particular DAG.

Figure 2:
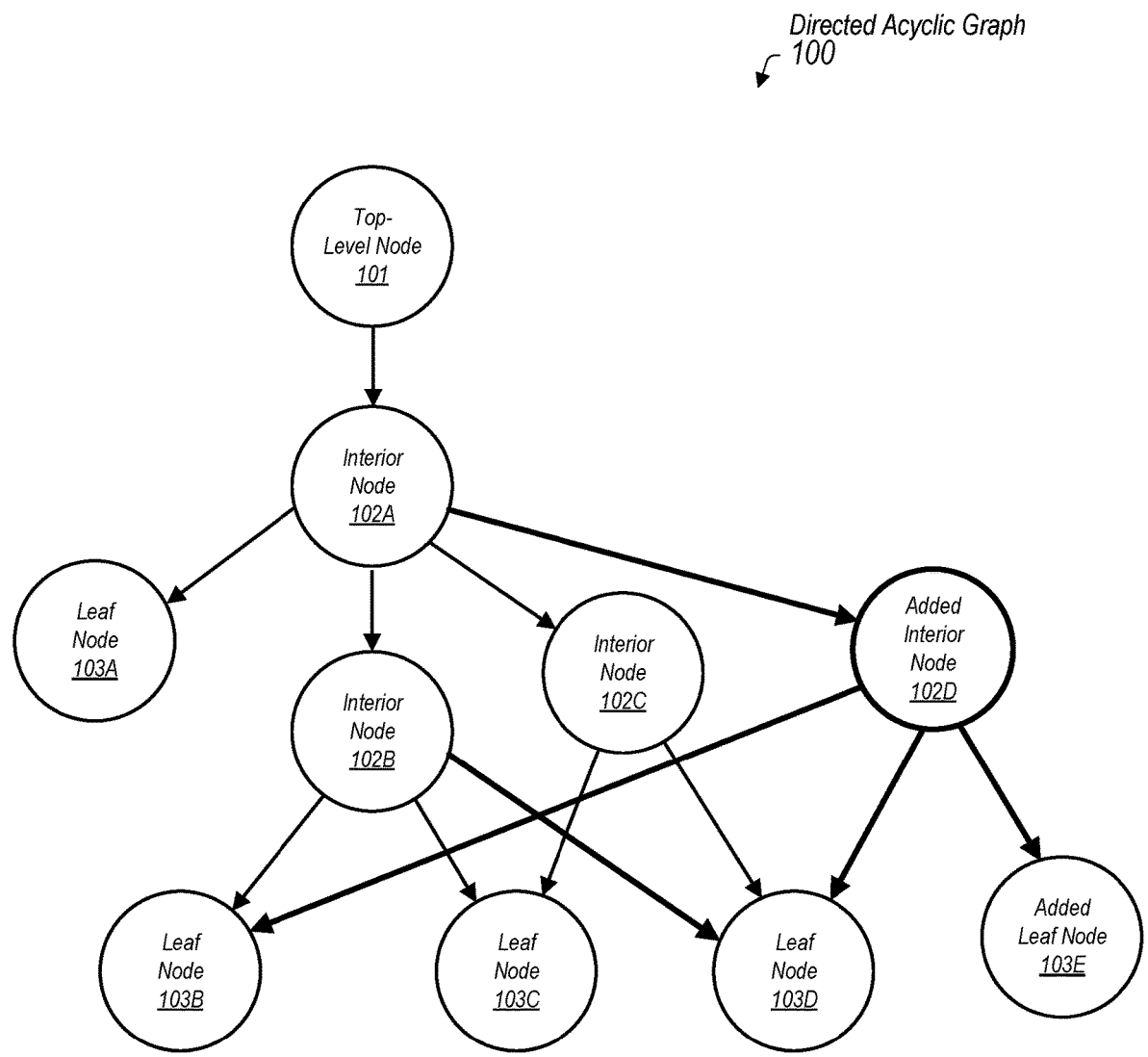
FIG. 2 is a diagram illustrating one embodiment of adding nodes to a data structure.

Graph Examples and Application Features:

FIG. 2 is a diagram illustrating one embodiment of a graph structure in which nodes are added.

In the illustrated example, a user has added interior node 102D. Application 50 may receive several inputs for the "add interior node" operation. In some embodiments, these inputs may include at least one parent interior node (here, node 102A, as indicated by a bolded connection), a title for the new node, and a description. Optionally, the add interior node operation may also allow the user to specify a list of existing child nodes that should be linked to the added node. In FIG. 2, existing leaf nodes 103B and 103D may be linked as child nodes of 102D.

FIG. 2 also illustrates the addition of a leaf node 103E after the addition of interior node 102D. Application 50 may receive several inputs for the "add leaf node" operation. In some embodiments, these inputs may include one or more parent interior nodes for the leaf node to be added (here, interior node 102D), as well as a link to a file (e.g., document) corresponding to the new leaf node. The add operation may also specify various types of metadata, including filename, title, date (e.g., of publication), one or more author names, type of presentation. Other possible types of metadata include one or more "collections" to which the file belongs, and a long-form description of the document. After leaf node 103E is added, the new node will exist in DAG 100, and a new link will be added to this node from interior node 102D. For example, if any collections are specified, node 103E will be added to these. The add operation will also update any relevant metadata-based nodes.

FIG. 2 also depicts that an existing leaf node may also be linked to an existing interior node. As shown, existing leaf node 103D may be linked to existing interior node 102B. Inputs for this operation are a specification of the leaf node to be linked, and the interior node to link from. After this operation, the interior node will appear in the path name or "breadcrumb" for the leaf node.

FIG. 3 is a diagram illustrating one embodiment of a graph structure and the splitting of a node into two separate nodes. In some cases, the classifications/sub-classifications of a particular interior node 102 may evolve over time to a point in which it makes sense to split the particular interior node 102 into two or more interior nodes 102. In the example, prior to the split operation, assume that interior node 102B has no child nodes (it may have recently been added) and that interior node 102C has a single child node (103D). Also, assume that parent node 102A of node 102S has already been updated such that it no longer points to node 102S, but instead points to nodes 102B and 102C. Subsequently, interior node 102S is split into interior nodes 102B and 102C. Prior to splitting, interior node 102S included pointers to leaf nodes 103B-D (shown with dashed lines). In splitting interior node 102S, these pointers are assigned to either nodes 102B or 102C based on user input specified in the split command. In this example, interior node 102B is updated to include pointers to leaf nodes 103B and 103C, while interior node 102C is updated to include pointers to leaf nodes 103B and 103D.

Application 50 can split an existing node into two or more existing or new nodes. In some embodiments, the inputs for the "split node" operation are the node to be split (the "original node"; here, node 102S), and a list of "tuples" of the form [filename/title/description/node list]. Each tuple specifies a destination interior node filename (either an existing or a to-be-created node), a node title (optional if the node already exists), a node description (optional if the node already exists), and a list of nodes (either interior or leaf nodes) that were linked from the original node and now need to be moved to the destination interior node specified earlier in the tuple. If any of the destination interior nodes already exist, then the links are appended to the existing interior node. If the nodes don't exist, they are created (with the given description).

If the original node is not among those listed in the destination list, it is converted to a redirect page that has pointers to the destination nodes. For example, if interior node "vanilla" is split into "vanilla" and "chocolate," no redirect page is created. On the other hand, if interior node "vanilla" is split into "strawberry" and "chocolate," then "vanilla" is converted to a "redirect node" that might read "This category has been split. See [strawberry] or [chocolate]." In FIG. 3, node 102S is shown as a dashed circle to indicate that it is now a redirect node. The redirect message for node 102S points to nodes 102B and 102C via links 104A-B.

Note that an interior node rename operation may be performed with a split command with a single destination node corresponding to the new interior node name and all current child links listed in the tuple. Renaming of a leaf node is also depicted in FIG. 3. The user simply needs to specify the current filename and the new filename. As shown, in response to renaming of leaf node 103A, a new node, 103E, is created. Metadata is copied from node 103A to 103E. Additionally, node 103A may be converted into a redirect node, such that any links to 103A will return a message—for example, the message may indicate that the filename is no longer valid, and provide a link to node 103E.

FIG. 4 is a diagram illustrating one embodiment of a graph structure and a merge operation. This example illustrates the merging of interior nodes 102B and 102C into interior node 102M. The merging of nodes may occur for various reasons, such as a change in how items are viewed over time. As shown, prior to the merge, interior node 102B has leaf nodes 103B and 103C, while interior node 102C has leaf nodes 103C and 103D. (These connections are shown with dotted lines, to indicate pre-merge conditions.) Merge command inputs may include the name of the destination node of the merge, which may be a tuple of [filename/title/description], or just a filename if the node already exists, as well as a list of the interior nodes to be merged. The destination node, if it doesn't already exist, is created as a result of this command. The merged nodes (e.g., 102B and 102C) are converted to redirect nodes, such that links to these nodes will redirect to new node 102M.

FIG. 5 is a diagram illustrating one embodiment of a graph structure and a deletion operation. From time to time, it may be necessary or desirable to delete nodes from DAG 100. For example, a particular taxonomy may become disfavored over time. Here, suppose that prior to a deletion command being specified, interior node 102D is a child of node 102A and points to leaf nodes 103C and 103D. Prior to the deletion command, node 102D may be deleted as a child node of 102D, and nodes 103C and 103D may be updated such that they are child nodes of interior nodes 102B and 102C, respectively. Then, the links between these leaf nodes and node 102D may be deleted. (This step may help ensure that nodes for which the link deletion is performed have other parent nodes, so that these nodes are not orphaned within DAG 100.) Now, node 102D may be deleted by turning that node into a "tombstone," which means that a link to node 102D will henceforth return a message that the node has been deleted, perhaps with some explanatory message. In this manner, the link to node 102D is preserved.

The various edit operations described with respect to FIGS. 2-5 can be set up as desired to enforce various desired properties of DAG 100. For example, if DAG 100 is set up with a rule that specifies no nodes, once created, can ever be orphaned (that is, if not deleted, a node must be reachable from top-level node 101). In this case, certain edits may be multi-step. For example, consider the delete operation of FIG. 5. In one implementation of the delete operation, assume that node 102D is a child of 102A, and is a parent of leaf nodes 103C and 103D. A user may submit a command to delete node 102D. Application 50 may implement the delete operation in multiple stages. First, application 50 may direct the user to specify whether the link between node 102A and 102D is to be left in place or deleted. Second, application 50 may direct the user to reassign the child nodes of 102D such that they have valid parent nodes, and once accomplished, delete the child links of node 102D. Third, with these operations accomplished, application 50 may then change node 102D such that it now returns a tombstone. In short, edit operations on DAG 100 may be performed in some cases as a multi-step operation to enforce certain desired graph properties. Alternately, edit operations may be discrete operations. Thus, a valid delete operation may be performed as described in the preceding paragraph. In some implementations, a certain graph operation may not be permitted if application 50 determines certain conditions exist. For example, application 50 may not allow the deletion of node 102D if such an operation would create orphan nodes.

It may be desirable in some cases, to have an administrative edit mode, in which a series of edits to the graph are made, compliance with desired graph properties is checked, and then changes are "committed" to the graph and the administrative edit mode is then terminated. This may be accomplished by operating on a shadow copy of the graph, and then updating the original graph once the changes are deemed compliant. (Or these changes may be performed on the graph itself.) In this manner, an administrative user can try out certain changes to the graph before finalizing them. This mode might also include an "undo" command as is common in other software programs, in case edits introduce unintended consequences. Edits may, in some embodiments, be accomplished by operating on content controlled by a source control repository. All changes may be made to a local copy of the repository, and then committed to a primary repository. There may subsequently be a promotion to a live production system in some embodiments.

Figure 6:
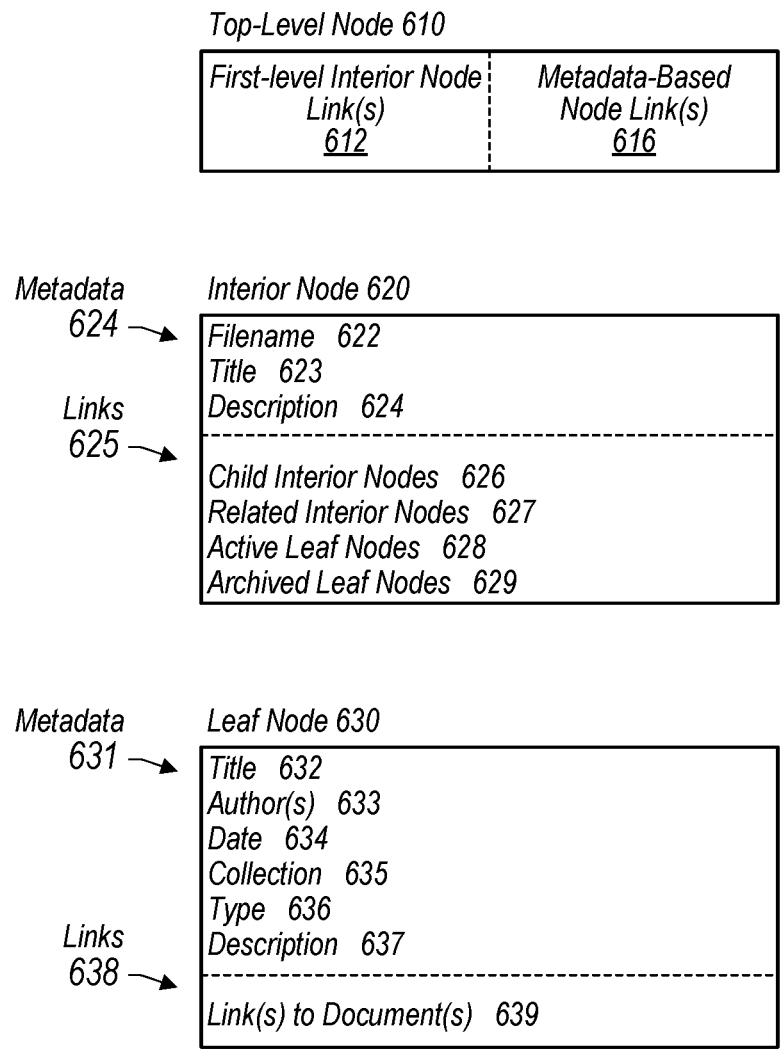
FIG. 6 is a diagram illustrating example formats of a top-level node, an interior node, and a leaf node in one embodiment of a data structure.

Turning now to FIG. 6, formats of different node types in DAG 100 are shown. As has been described, DAG 100 may have a top-level node, as well as interior or leaf nodes. FIG. 6 shows exemplary formats for top-level node 610, an interior node 620, and a leaf node 630.

Top-level nodes such as node 610 may act as an entry point to the graph, although nodes may also be accessed through direct links. Top-level node 610 may include, in one embodiment, links 612 to one or more first-level interior nodes. In some implementations, the first-level of interior nodes in DAG 100 may correspond to different taxonomies. For example, top-level node 610 might include links 612 to two interior nodes: one that corresponds to the Dewey Decimal system, and one that corresponds to the Library of Congress classification system. The presence of these two interior nodes may allow the user to traverse DAG 100 using different taxonomies, which may have completely different sets of interior nodes in some implementations, while sharing some or all leaf nodes.

Top-level node 610 may also include links 616 to metadata-based nodes. Metadata-based nodes are nodes whose content is created or updated automatically based on metadata in other nodes of DAG 100. In some implementations, creation of a new DAG may, by default, set up certain metadata-based nodes. One type of metadata-based node that may be set up is a node that will link to all leaf nodes in the DAG. The content of this node will grow as leaf nodes are added to the DAG. In other implementations, a user may specify non-default types of metadata-based nodes.

Figure 7A:
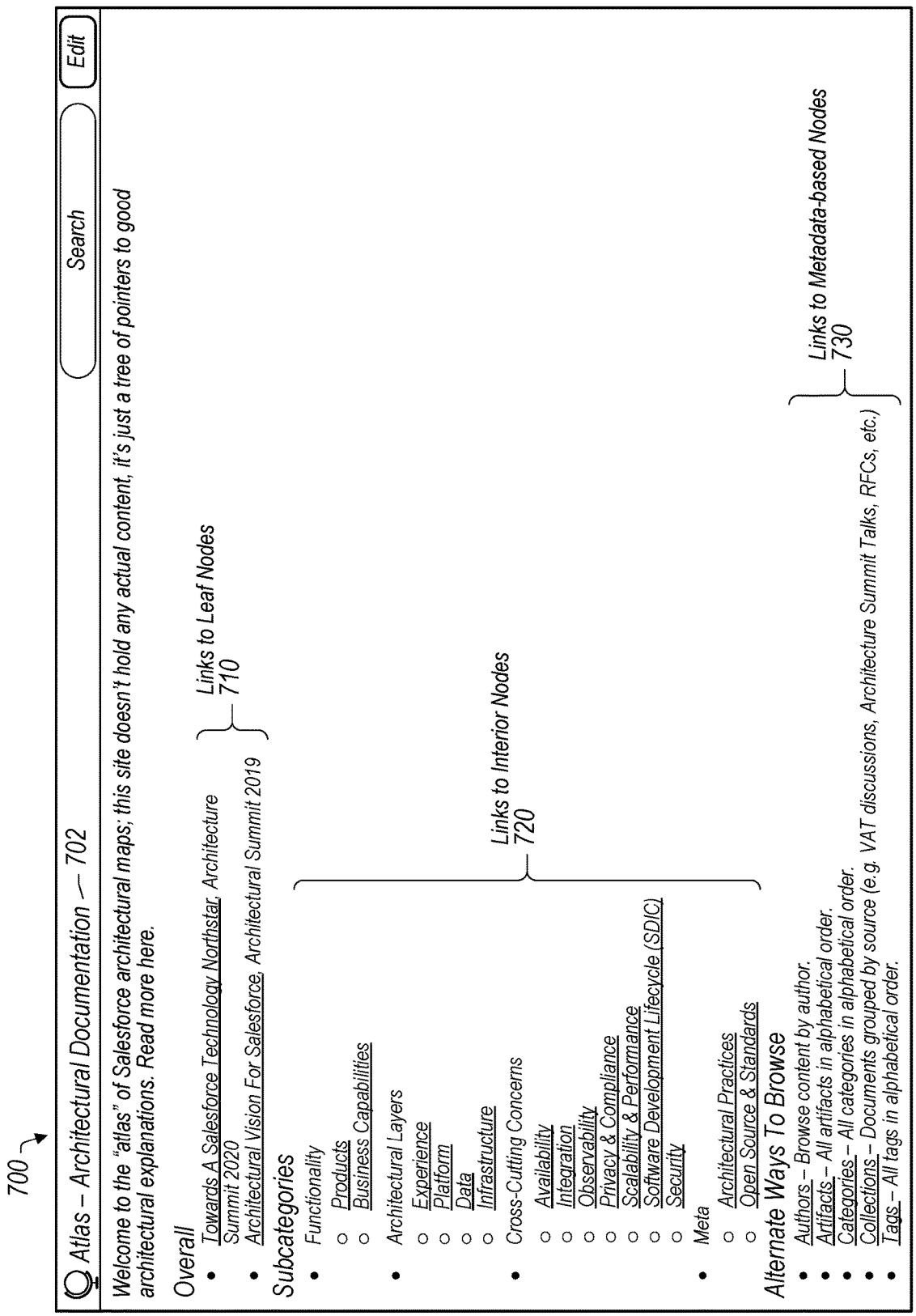

As another example, top-level node 610 may have a metadata-based node for a particular "collection" of documents. For example, all the documents associated with a particular symposium might be considered part of a certain collection. As will be described below, when a leaf node is added to DAG 100, the user will supply associated metadata. That metadata might indicate, for example, that the document(s) for that leaf node were associated with the particular symposium, and thus are part of a collection for the symposium. If a particular metadata-based node has been set up for that collection, the addition of the leaf node will cause the particular metadata-based node to be updated to include a link to the new leaf node. Thus, if top-level node 610 includes a link 612 for a collection for the particular symposium (or a nested series of links), selecting that link will take the user to a page that includes links to all documents referenced by DAG 100 that belong to that collection. These nodes are called "metadata-based nodes" to indicate that they are automatically created and updated based on the addition of other nodes added by the user (e.g., leaf nodes). The content of these nodes are derived based on metadata for other nodes in DAG 100. Note that metadata-based nodes may be generated based on any type of metadata collected for nodes in DAG 100, and thus are not limited to "collections." Other metadata-based nodes could be established for authors. For example, a particular metadata-based node might show all documents referenced in DAG 100 that are authored by Agatha Christie. Other metadata-based nodes might exist for other authors. FIG. 7A below includes a screenshot of a top-level node in an example DAG 100.

As shown, a format for interior node 624 may include metadata 621 and links 625. The particular types of metadata 621 may vary in different embodiments. Similarly, various ones of links 625 may not be present in all embodiments—for example, related interior nodes 627 and archived nodes 629 may not appear in some implementations.

Metadata 621 may include a variety of types of information in different embodiments. In some implementations, filename 622 indicates the name of a file that stores the information associated with the node. Title 623 is, as its name suggests, the name of the interior node (e.g., "Network," "Infrastructure," "Security," etc.). Description 624 is a description of the category. In some implementations, it may be possible to view all interior node topics alphabetically along with their descriptions—description 624 may indicate to a user whether the interior node is relevant or not.

Links 625 may include links to other interior nodes via links 626. The current interior node would be considered a parent node to these child nodes. Additionally, links 625 may also include, in some embodiments, links to "related" interior nodes that do not have a parent-child relationship with respect to the current node. These related interior nodes may simply be indicated to facilitate exploration of DAG 100 by the user. Specification of related interior nodes might be used in a variety of settings—for example, items may be correctly categorized in different places in the taxonomy, but someone might reasonably be confused by similar sounding titles. For instance, a Top>>Data>>Metadata node might include a statement that reads "This is a related but distinct concept from 'Platform Metadata' <link>, which can also include data schemas, but generally includes higher-level concepts that are specific to the platform and business capabilities layer."

Similarly, links 625 may also include links to leaf nodes. As will be discussed further below, leaf nodes are a type of node that includes links to actual documents. In some implementations, links 625 may link to "active" leaf nodes 628, as well as "archived" leaf nodes 629. This type of implementation can be used to indicate to the user which set of documents is most current (active leaf nodes 628), while also preserving non-current versions (archived leaf nodes 629). Archiving leaf nodes makes it possible to preserve incoming links to these nodes, such that users do not receive a broken link to a node within DAG 100. Screenshots of exemplary interior nodes in one implementation of DAG 100 are shown below with respect to FIGS. 7B-C.

Leaf nodes such as node 630 may also include metadata 631 and links 639. Examples of metadata 631 include leaf node title 632, leaf node author(s) 633, and a date 634 associated with the documents linked to the leaf node. Still further, collection 635 indicates the filename of the collection that this leaf node is part of, if any. As noted above, an example of a collection is all documents associated with a particular conference or symposium. Type 636 is, as its name suggests, a brief categorization of the type of document associated with the leaf node. In one implementation for documents associated with a software architecture, types might be "Tech Talk," "Long-Range Plan," "White Paper," etc. It may be desirable to have a catchall "Other" bucket for type 636. In other implementations, the type metadata value may be replaced with a "tag" metadata value. In some embodiments, a tag operates as a many-to-many replacement for type, and allows any number of attributes. For example, a document might we tagged as a "whitepaper," "1-pager," and "essential onboarding documents." Tags may also function similarly to collections in that they may automatically generate index pages. Finally, description 637 is, in one embodiment, a summary of the document. It may be desirable for description 637 to be robust enough to indicate to a user whether it is worth his or her time to click through to view the actual content.

Link(s) 639 are links to one or more documents associated with leaf node 630. In general, a particular leaf node will be linked to single document (or, more broadly, an "artifact"). But in some case, a single artifact may exist in multiple formats. For example, a particular presentation at a company meeting may exist as a POWERPOINT presentation, a YOUTUBE video, a white paper, etc. Accordingly, some leaf nodes may include multiple links 639 to different versions of what is, in essence, the same (or extremely similar) content. Note that in other implementations, similar documents may each be linked separately from a particular interior node. A screenshot of a leaf node in one implementation of DAG 100 is shown below in FIG. 7D.

Turning now to FIG. 7A, a screenshot of an interface 700 for a top-level node of a knowledge graph is shown. In this particular example, the knowledge graph is entitled "Atlas—Architectural Documentation," as indicated by reference numeral 702. This particular data structure is concerned with software architecture documents of SALESFORCE, but the techniques in this disclosure are pertinent to any types of documents or artifacts to which one or more taxonomies may be applied.

Figure 7B:
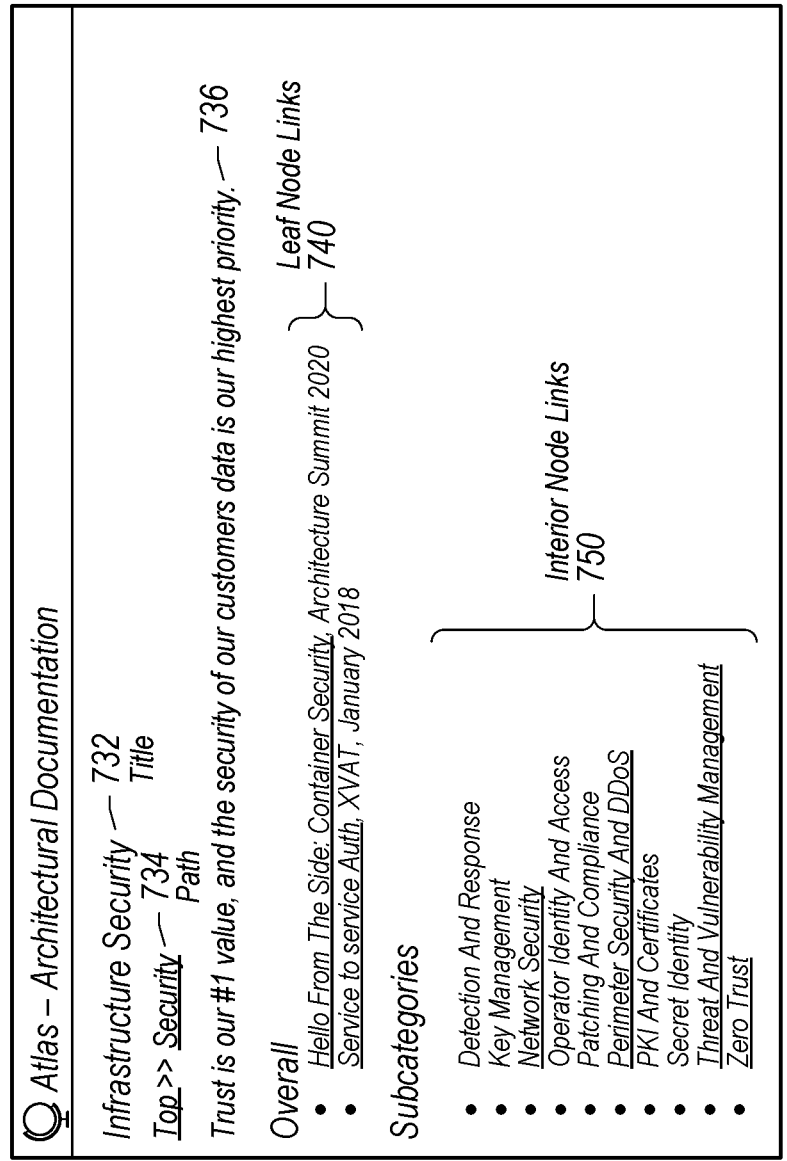

Interface 700 includes three sections, entitled "Overall," "Subcategories," and "Alternate Ways to Browse." The "Overall" section includes links 710 to leaf nodes associated with the top-level node. (Links in FIGS. 7A-D are shown with text that is underlined.) A representative interface for a leaf node of this knowledge graph is shown below in FIG. 7D. The "Subcategories" section includes links 720 to first-level interior nodes of the knowledge graph. As shown, links 720 include links entitled "Products," "Business Capabilities," "Experience," etc. Representative interfaces for interior nodes of this knowledge graph are shown in FIGS. 7B-C. In some implementations, top-level node might include entry points that explicitly designate two different taxonomies for exploring documents linked by the graph.

The "Alternate Ways to Browse" section includes links 730 to metadata-based nodes. As shown, there are links to five metadata-based nodes: Authors, Artifacts, Categories, Collections, and Tags. In contrast to interior nodes and leaf nodes, which are added to the data structure in response to user input, metadata-based nodes may, in some implementations, be set up along with the creation of a new knowledge graph. Then, as nodes are added to the graph with metadata, the metadata-based nodes may be updated to reflect the new entries. In other implementations, new metadata-based node types may be defined over time by users. Some metadata-based nodes may be based on a combination of different metadata values (e.g., a "combo" node that lists all conference papers for a particular year).

For example, suppose a new leaf node is added to the graph. Among other things, this new node may have metadata specifying an author associated with the document/ artifact. As part of the "add leaf node" operation performed by the application that creates and edits the graph, the application may, in addition to adding the leaf node to the graph, update one or more metadata-based nodes. For example, the application may update the "author" metadata-based node based on the author of the new node. Note that the "author" node may, when selected, take the user to an interface that lists all authors of documents in the graph. These author links may in turn be selected to show all documents linked by the graph for that particular author. For example, suppose the author of the document associated with the new leaf node is Ian Varley. After the leaf node is added, if there are no other documents linked by the graph that are authored by Ian, application 50 might create a child node of the metadata-based "Author" node that is associated with Ian. Selection of the Ian Varley node will then take the user to an interface associated with the new leaf node. If, on the other hand, there are existing documents linked by the graph that are authored by Ian, a link to the new leaf node will be added to the existing Ian Varley node.

Note that, in interface 700, there are also metadata-based nodes that list all "categories" (another name for interior nodes) and all "artifacts" (leaf nodes). There is also a metadata-based node that shows all collections within the graph, as previously discussed. As noted, the application may permit the user to define new metadata types, and to also specify new metadata-based nodes after graph creation. Accordingly, the application may have certain pre-specified metadata-based nodes for a new graph in some implementations, and may also permit addition of custom metadata-based nodes.

FIG. 7B depicts a screenshot of an interface 731 for a sample interior node accessible. This node is entitled "Infrastructure Security," as indicated by reference numeral 732. This node also includes a brief description, as indicated by reference numeral 736.

A path 734 is also shown for this node. The path indicates the sequence of nodes that are traversable to reach the current interior node. Here, the node shown is accessible from the "Security" link from the top-level node—hence the path "Top>>Security." As has been explained, the path for a node may also be referred to as its "breadcrumb," so-named because it indicates a "trail" that may be followed to reach the current node. To facilitate graph exploration, each component of the path/breadcrumb may be selectable to navigate to the constituent node. For example, consider the path A>>B>>C>>D>>E. Each component of this path may be selectable to navigate to nodes A, B, C, D, and E, respectively. As will be shown below, some nodes may have multiple possible paths—the interface may thus indicate each such path.

As with interface 700, interface 731 also includes sections entitled "Overall" and "Subcategories." The "Overall" section includes links 740 to leaf nodes associated with this interior node—that is, leaf nodes associated with infrastructure security. The "Subcategories" section includes links 750 to child interior nodes of the current node. Note that in some implementations, certain subcategories shown are not populated within the knowledge graph, meaning that there are no child interior or leaf nodes yet associated with them (such text are not underlined in FIGS. 7A-D to show that there is no link). Accordingly, such text is not selectable to navigate further. These subcategories may nevertheless be shown to indicate that this subcategory is contemplated. Other subcategories, though, may be selectable to navigate further within the graph.

Turning now to FIG. 7C, a screenshot of an interface 760 for a different interior node is shown. This node is entitled "Network Security," as indicated by reference numeral 762. Interface 760 also includes a description of the node, as indicated by reference numeral 766. Still further, interface 760 includes a link 768 to a leaf node that is shown below with reference to FIG. 7D.

Interface 760 corresponds to a node that is reachable via two different paths, 764A and 764B. The first path 764A is "Top>>Security>>Infrastructure." This means that the user can navigate from the top-level node to the "Security" interior node shown in FIG. 7A. The user can then navigate to the "Infrastructure Security" interior node shown in FIG. 7B, and from there to the current node. Alternatively, the user can navigate from the top-level node to the "Infrastructure" node shown in FIG. 7A to a child "Network" node to the current node. As described above, the components of each of these paths 764 may be individually selectable to navigate to the corresponding top-level or interior node.

FIG. 7D is a screenshot of an interface 771 for a leaf node linked from interface 760. This leaf node is entitled "Getting in the Zone," as indicated by reference numeral 772. Similar to the description given in FIG. 7C, this leaf node is reachable via two different paths. Path 774A is made up of the following sequence of nodes: "Top>>Security>>Infrastructure." Path 774B, on the other hand, is made up of the sequence "Top>>Infrastructure>>Network>>Network Security." This latter path is the one that travels through the interior node shown in FIG. 7C.

Interface 771 also includes a link 776 to the "Getting in the Zone" document. DAG 100 thus does not actually contain the document in this implementation. Instead, the document may reside in any suitable information repository accessible by application 50.

Still further, interface 771 includes a list of values of various types of metadata for the document. This metadata includes a date 778 for the document (May 2018), a type 780 of the document (Article), an indication of a collection 782 (Architecture Strategy), an author 784 (David Murray), and a summary 786. Many other different types of metadata are possible in other implementations.

Figure 8:
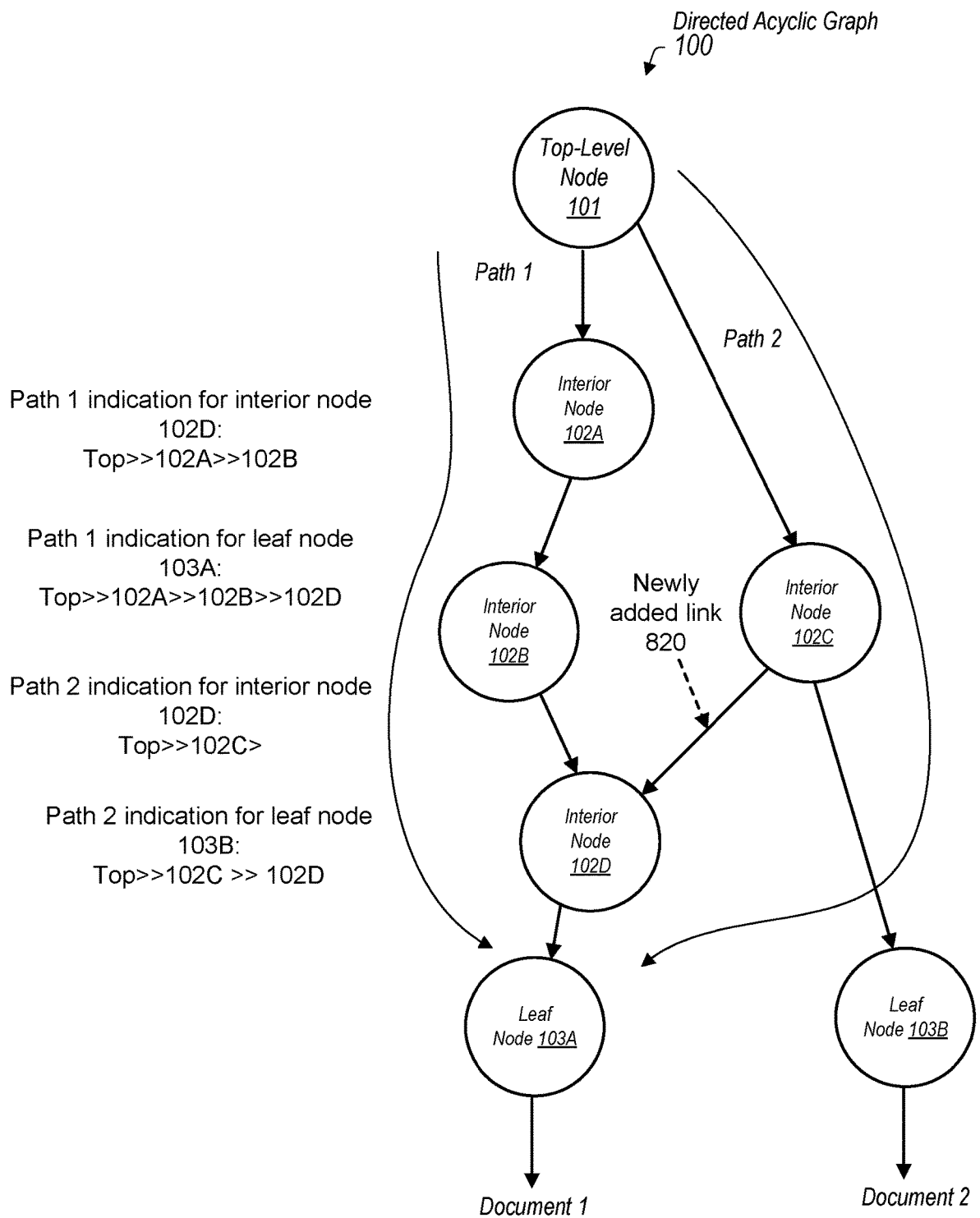
FIG. 8 is a diagram illustrating the addition of a second path for a node in one embodiment of a graph structure.

FIG. 8 is a diagram illustrating how a particular node might be part of multiple taxonomies within DAG 100, and thus have multiple paths. In the illustrated example, leaf node 103A is initially created as a child node of interior node 102D. Accordingly, the initial path for leaf node 103A is Top>>102A>>102B>>102D. An indication of this path may be displayed when leaf node 103A is viewed. Each element of the path may be selectable as a hyperlink in some embodiments to permit users to navigate to different parts of DAG 100.

DAG 100 also includes interior node 102C, which is a child node of top-level node 101. Leaf node 103B is a child node of node 102C. But via an edit that adds link 820, a user can indicate that interior node 102D is also a child node of interior node 102C. In response to this user input indicative of the addition of another parent node for interior node 102D, application 50 will an additional path for node 102D (path 2) while preserving an existing path for the node (path 1). As such, subsequent to creation of path 2, an access to node 102D will output information that is displayable by a user interface (UI) for the node. This user interface will include an indication of two (or more) paths for reaching the particular node. Path 1 defines a prior taxonomy for node 102D, and Path 2 defines an alternate taxonomy for the node 102D. As a child node of interior node 102D, an additional path will also be added for leaf node 103A.

Method Figures

Figure 9A:
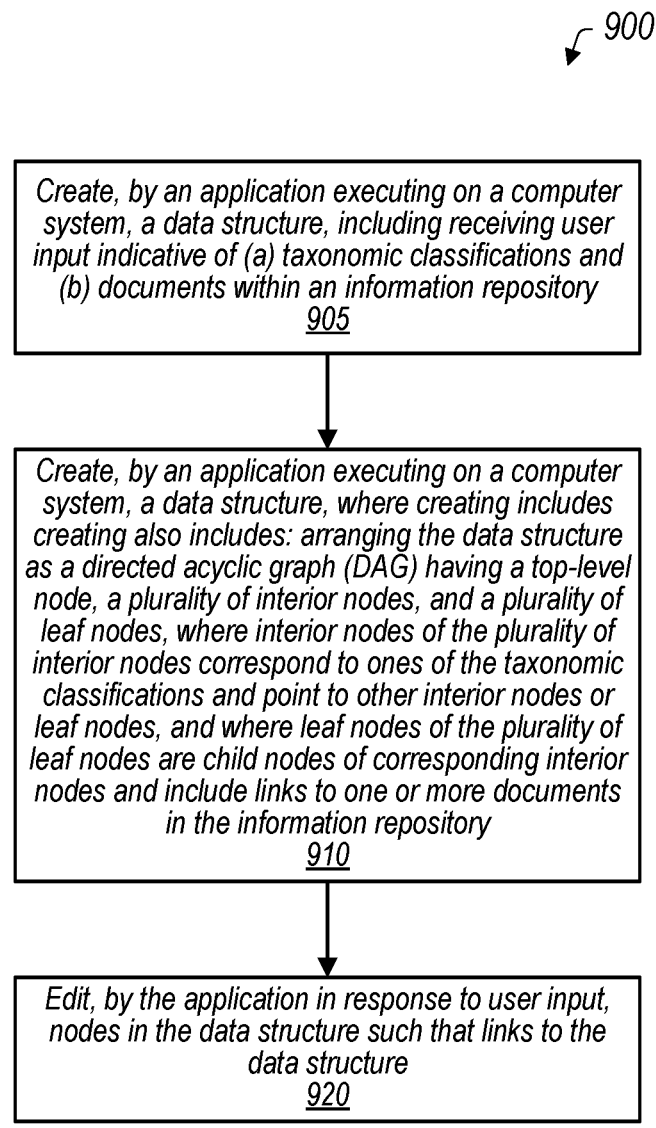
FIG. 9A is a flow diagram illustrating one embodiment of a method for creating and editing a graph structure.

FIG. 9A is a flow diagram of one embodiment of a method for creating and using a graph structure. Method 900 as disclosed herein may be used to create a data structure in accordance with any of the embodiments and features discussed above in reference to FIGS. 1-8.

Method 900 includes creating, by an application executing on a computer system, a data structure, wherein the creating includes receiving user input indicative of (a) taxonomic classifications and (b) documents within an information repository (905). In performing 905, the user input received by the application may specify metadata for particular nodes within the data structure (clause a), as well as links that establish a location for a node within a hierarchy established by DAG 100 (clause b). As noted, the application permits multiple taxonomies to be utilized for a given set of nodes. This permits different users to maintain different views of how data should be organized, and for both views to be accommodated in one knowledge graph.

The creating further includes, in 910, arranging the data structure as a directed acyclic graph (DAG) having a top-level node, a plurality of interior nodes, and a plurality of leaf nodes, where interior nodes of the plurality of interior nodes correspond to ones of the taxonomic classifications and point to other interior nodes or leaf nodes. Thus, a particular interior node is created to have a particular path (e.g., "Top>>Infrastructure") made up of a sequence of interior nodes. Furthermore, leaf nodes of the plurality of leaf nodes are child nodes of corresponding interior nodes and include links to one or more documents in the information repository. Leaf nodes are thus created by user input specifying a relationship to one or more parent interior nodes, as well as user input specifying locations of one or more documents corresponding to the leaf nodes.

Method 900 further includes, in 920, performing, by the application in response to user input, edits on nodes in the data structure, wherein a given edit is performed such that links to nodes in the data structure as they were arranged prior to the given edit are preserved.

In method 900, nodes in the data structure are created and edited via the application such that a user interface for a given node includes an indication of one or more possible paths for reaching the given node. These paths facilitate exploration within the data structure. As noted, a particular node may be reachable via multiple paths. Thus, if a user has reached the particular node via a first path, the user may wish to navigate to an interior node that is found in the second, but not the first, path. The user interface may make each component of the path (i.e., interior nodes within the path) selectable to navigate to a corresponding portion of the data structure.

Method 900 may include additional features not depicted in FIG. 9. The editing of nodes in the data structure may include adding interior nodes that permit one or more nodes in the data structure to be reached via multiple paths starting from the top-level node, where a given path includes a sequence of interior nodes within the data structure. An indication of a possible path for reaching a node includes a set of interior nodes included in the possible path, and corresponding selectable links to navigate to particular nodes of the set of interior nodes. For example, consider the path "Top>>Infrastructure>>Security." This path includes the following sequence of interior nodes: Infrastructure>>Security. Both "Infrastructure" and "Security" may include selectable links that enable the user to navigate to the corresponding interior nodes. When user-specified edits link a particular node to an additional parent node, this will cause the particular node (and any child nodes) to thus have an additional path. Accordingly, the application may add a path indication of the particular node (and any child nodes) that corresponds to a path that includes the additional parent node.

The edits of 920 may take various forms. For example, the edits permitted by the application may include adding, splitting, and joining interior nodes. The edits may also include removing interior nodes; in one embodiment, removal of a particular interior node may be performed such that the application, in response to receiving an incoming link for a removed interior node, will return a tombstone indication. An interior node might be removed as a result of an editing process in which the category corresponding to the interior node may has been reconceptualized, and thus no longer part of a current taxonomy. Child interior nodes or leaf nodes may have been moved to point to other nodes in the data structure prior to removal. The node being removed may then be turned into a tombstone node that provides an indication to a user that the node is no longer valid (it might also include a link to a related node in some implementations). But significantly, the link to the node being removed will remain valid.

Editing of the nodes of DAG 100 may be performed such that once a node is created, the link to that node will be preserved (i.e., remain valid, such that it will not return a "link not found" error). In one implementation, individual nodes within DAG 100 may be implemented as web documents that link to other web documents in the graph; thus, each node may have a link associated with it (e.g., a URL) that allows the node to be directly accessed by a user that has the link. As noted, after DAG 100 is created, it may be subsequently edited. Editing of DAG 100 may be performed such that once a node has been created, a link to that node can subsequently be used without an error being returned (e.g., "link not found," etc.). This is the case even if nodes in the graph are updated over time. The edits of 920 may thus performed while preserving links to nodes made at any point within the lifecycle of DAG 100. This may be performed with respect to various editing operations as described above with respect to FIGS. 2-5. Thus, while some nodes are merged or split, or even deleted, a link to a given node may be preserved by allowing that link to return a non-error message to the user that submits a request for a node via the link. A link may be preserved in various ways. In some instances, the content of the node may be changed. For example, in the context of a split, the node that has been split may be modified to include content that, when the node is accessed, indicates that the node has been split and provides multiple options for the various split destinations. In other instances, the nature of the node may be changed. For example, if first and second nodes are merged into a third node, the first and second node may be changed into "redirect" nodes that will merely redirect to the third node when accessed. Accordingly, when user input is received that specifies changing an arrangement of nodes with the data structure, performing edits to the node may include maintaining the arrangement of nodes within the data structure but changing the content or nature of the node such that the specified changes appear to be implemented to a user traversing the data structure. Note that references to changing the "content or nature" of a node includes changing both the content and the nature of the node.

In some embodiments, the application ensures that nodes in the data structure added to certain parts of the graph (e.g., nodes descending from first-level interior nodes) are either interior nodes or leaf nodes. Interior nodes are created using user input specifying taxonomic classifications (e.g., user input specifying that "Security" should be a category under "Infrastructure"). Leaf nodes are created using user input specifying document metadata and links to documents. Other graph requirements may be enforced by the application. For example, the application may enforce a format for DAG 100 in which nodes that the user adds, in addition to conforming to the interior node or leaf node format, must not introduce a cycle into the graph (which would cause the graph to no longer be a DAG).

The top-level node, in addition to pointing to interior and leaf nodes, may include pointers to a plurality of metadata-based nodes that are automatically created or generated from metadata in nodes of the data structure. Examples of these metadata-based nodes include "Author" and "Collection" nodes. These nodes may be automatically created or updated by the application in response to user input creating or updating an interior or leaf node.

Method 900 contemplates that taxonomies may change over time. Thus, the application permits creating and editing the data structure such that a given node may reached via multiple possible paths. The user interface for the given node may include an indication of the multiple possible paths, where an indication of a possible path in the user interface includes selectable links to permit the user to navigate to corresponding interior nodes within the possible path.

While leaf nodes in method 900 are described as pointing to "documents," in other embodiments the nature of items pointed to by leaf nodes may vary. More broadly, leaf nodes can be said to point to "artifacts," which encompasses documents as well as other types of digital content, including images, audio, video, etc. Interior nodes may also be referred to as "category" nodes, since these nodes can be referred to as categories within some taxonomic hierarchy. As such, the present disclosure contemplates a variation of method 900 in which "documents" are "artifacts" and interior nodes are referred to as "category nodes."

The present disclosure also contemplates program instructions stored on a non-transitory, computer-readable storage medium. These instructions, when executed, can cause a computer system to perform operations corresponding to method 900 and variations thereof described above. Similarly, systems are contemplated that are configured to perform method 900 and the variations described above.

As has been described, application 50 is executable to create and edit a directed acyclic graph such as DAG 100. Application 50 may permit, in some embodiments, multiple taxonomies, meaning that there may be multiple paths to a particular node. Method 940 described below illustrates such a situation.

Turning now to FIG. 9B, a flowchart of one embodiment of another method 940 for creating and editing a DAG is shown.

Method 940 begins in 950, which includes accessing a data structure arranged as a directed acyclic graph (DAG) that includes a top-level node, a plurality of interior nodes, and a plurality of leaf nodes. As has been described, interior nodes of the plurality of interior nodes may correspond to a category within a taxonomic hierarchy and point to other interior nodes or leaf nodes. Leaf nodes, on the other hand, have corresponding parent interior nodes and include links to one or more artifacts in an information repository.

In 960, there is user input indicative of addition of an additional parent node for a particular node within the taxonomic hierarchy of the DAG. For example, suppose the particular node (called "Security") has a single path: "Top>>Infrastructure>>Security." Suppose further that there is another node in the graph with the path "Top>>Network." In the context of this example, the user input in 960 may constitute linking the particular node, whose sole parent node is currently the "Infrastructure" interior node, to an additional parent node: "Network." In response to such input, 960 further includes creating an additional path for the particular node while preserving an existing path for the particular node. Accordingly, as a result of 960, there are two paths to the particular node: "Top>>Infrastructure>>Security" and "Top>>Network>>Security."

With this additional path created, an access to the particular node outputs information that is displayable by a user interface (UI) for the particular node, the user interface including an indication of two or more paths for reaching the particular node, a first of which is part of a prior taxonomy for the particular node that includes the existing path, and a second of which is part of an alternate taxonomy for the particular node that includes the additional path. In the above example, an interface for the particular node will display paths for both the existing path ("Top>>Infrastructure>>Security") and the additional path ("Top>>Network>>Security").

In some embodiments, the UI for the particular node after operation of method 940 includes indications of respective sets of interior nodes included in ones of the two or more paths—e.g., indications of the nodes "Top," "Infrastructure," etc. Furthermore, the indications of these nodes may include corresponding selectable links to navigate to particular nodes of the respective sets of interior nodes. Thus, the indication of, for example, "Infrastructure," may be a hypertext link that allows the user to navigate to that node.

In some embodiments of method 940, user-specified changes to the taxonomic hierarchy of the DAG are implemented by maintaining a current set of interior nodes in the DAG while changing the content or nature of one or more of the interior nodes such that the user-specified changes appear to be implemented to a user that is traversing the DAG. Further, in some embodiments, the data structure is created and edited such that any nodes added by the user that descend from first-level interior nodes must be either interior nodes or leaf nodes. Thus, application 50, in some embodiments, does not permit the user to create nodes descending from first-level interior nodes of other types of formats.

As with embodiments of method 900, variations of method 940 may include creating new nodes within the data structure via application 50. In response, application 50 may automatically create or update one or more metadata-based nodes in the data structure based on metadata supplied upon creation of the new node. These one or more metadata-based nodes may be accessible via the top-level node.

The present disclosure also contemplates program instructions stored on a non-transitory, computer-readable storage medium that are executable to perform operations corresponding to method 940 and variations thereof described above. Similarly, systems are contemplated that are configured to perform method 940 and the variations described above.

Computer System

Figure 10:
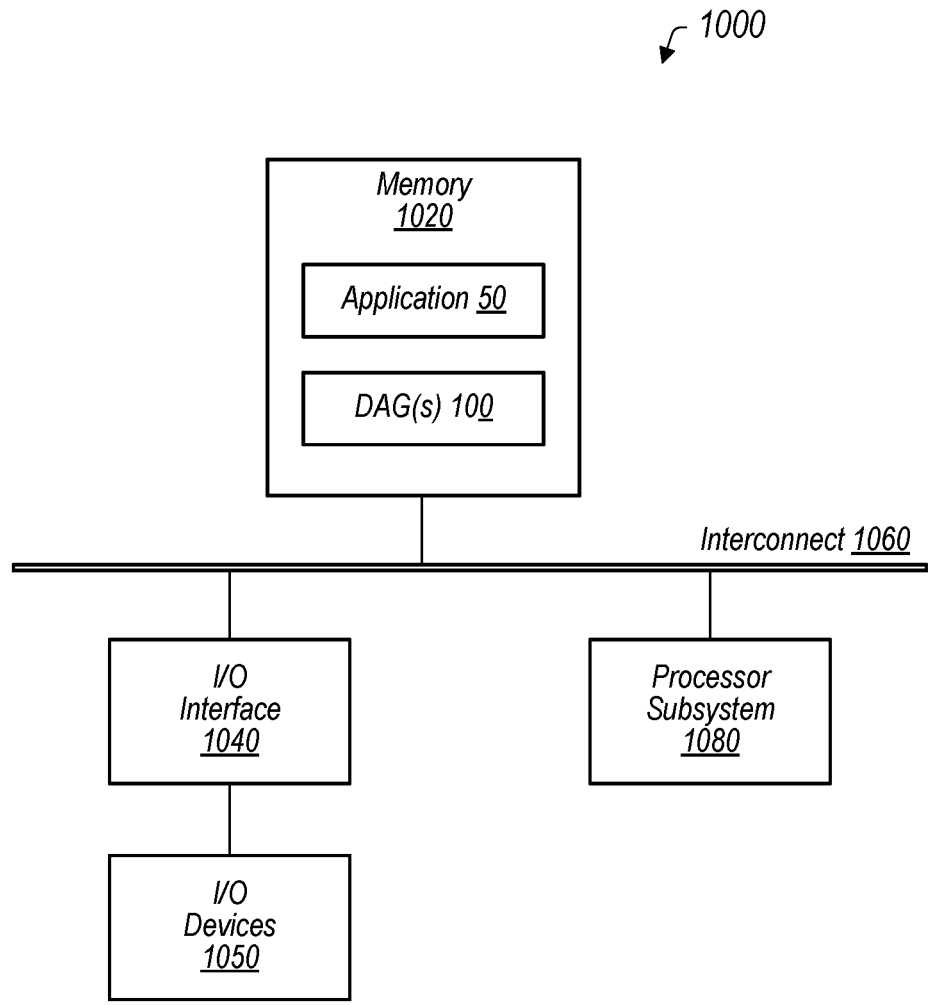
FIG. 10 is a block diagram of one embodiment of a computer system.

FIG. 10 is a block diagram of one embodiment of a computer system that may be used to implement teachings of the present disclosure. Instances of computer system 1000 as shown here may be implemented, in various embodiments, in systems described above, and may be connected to the same network.

Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices. Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080.

In the embodiment shown, when computer system 1000 is active, memory 1020 may have stored thereon application 50, as discussed above. A user of computer system 1000 may thus use application 50 to create an embodiment of DAG 100. Furthermore, a user of computer system 1000 may access documents by using application 50 to traverse a path through DAG 100 to the desired documents.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over Wi-Fi, Bluetooth, Ethernet, etc.).

Computer system 1000 is just one example system for executing application 50. In an enterprise environment, for example, application 50 may be hosted on an application server for a variety of geographically remote clients.

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other features outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3)

both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first element," "second element," "particular element," "given element," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Numerous variations and modifications will become apparent to those skilled in the art once the above disclosure is fully appreciated. It is intended that the following claims be interpreted to embrace all such variations and modifications.

What is claimed is:

1. A method, comprising:
    creating, by an application executing on a computer system, a data structure, wherein the creating includes:
        receiving user input indicative of (a) taxonomic classifications and (b) documents within an information repository; and
        arranging the data structure as a directed acyclic graph (DAG) having a top-level node, a plurality of interior nodes, and a plurality of leaf nodes, wherein interior nodes of the plurality of interior nodes correspond to ones of the taxonomic classifications and point to other interior nodes or leaf nodes, and wherein leaf nodes of the plurality of leaf nodes are child nodes of corresponding interior nodes and include links to one or more documents in the information repository; and
    performing, by the application in response to user input, edits on nodes in the data structure, wherein the edits are performed such that the DAG exhibits permanence in that links are preserved to nodes as they were arranged prior to the edits, and wherein the edits include splitting an interior node into multiple interior nodes and joining multiple interior nodes into a single interior node; and
    wherein nodes in the data structure are created and edited via the application such that a user interface for a given node includes an indication of one or more possible paths for reaching the given node.

2. The method of claim 1, wherein the edits include adding interior nodes that permit one or more nodes in the data structure to be reached via multiple paths starting from the top-level node, wherein a given path includes a sequence of interior nodes within the data structure.

3. The method of claim 1, wherein an indication of a possible path for reaching the given node includes:
    an indication of a set of interior nodes included in the possible path; and
    corresponding selectable links to navigate to particular nodes of the set of interior nodes.

4. The method of claim 1, wherein the edits permitted by the application further include adding interior nodes.

5. The method of claim 4, wherein the edits permitted by the application include removing interior nodes, such that a tombstone indication is returned in response to an incoming link for a removed interior node.

6. The method of claim 1, wherein the top-level node includes pointers to a plurality of metadata-based nodes that are automatically generated from metadata stored in user-created nodes of the data structure.

7. The method of claim 1, wherein the application permits creating and editing the data structure to permit a given node to be reached via multiple possible paths, wherein an indication of a possible path in the user interface includes selectable links to permit a user to navigate to corresponding interior nodes within the possible path.

8. The method of claim 7, wherein the top-level node includes pointers to a plurality of metadata-based nodes that are automatically generated from metadata in other nodes of the data structure.

9. The method of claim 1, wherein the application ensures that nodes in the data structure that descend from first-level interior nodes are either interior nodes or leaf nodes; and
wherein interior nodes are created using user input specifying taxonomic classifications, and wherein leaf nodes are created using user input specifying document metadata and links to documents within the information repository.

10. A non-transitory, computer-readable storage medium storing program instructions that, when executed, are capable of causing a computer system to perform operations comprising:
creating a data structure based on user input indicative of (a) categories within a taxonomy and (b) artifacts within an information repository, wherein the data structure is a directed acyclic graph (DAG) having a plurality of nodes including a top-level node, wherein the data structure is created to include:
interior nodes that specify links to one or more parent nodes and any child nodes; and
leaf nodes that specify corresponding parent interior nodes, links to one or more artifacts in the information repository, and metadata for the linked artifacts; and
performing, in response to user input, edits to nodes in the data structure, wherein the edits include at least one of a split edit or a join edit on a particular one of the interior nodes, and wherein the particular interior node remains in the DAG after the at least one of the split edit or the join edit; and
wherein nodes in the data structure are created and edited such that a user interface for a given node includes an indication of one or more possible paths for reaching the given node.

11. The non-transitory, computer-readable storage medium of claim 10, wherein one of the edits includes:
receiving a user request to split the particular interior node into two or more interior nodes; and
in response to the user input:
adding the two or more interior nodes; and
modifying the particular interior node to include links to the two or more added interior nodes, wherein the modifying results in a user interface providing an indication to a user navigating to the particular interior node that the particular interior node has been split into the two or more added interior nodes, thus preserving a link to the particular interior node.

12. The non-transitory, computer-readable storage medium of claim 10, wherein, for user input that specifies changing an arrangement of nodes within the data structure, performing edits to the nodes includes:
maintaining the arrangement of nodes within the data structure, but changing the content or nature of certain nodes such that the specified changes appear to be implemented to a user traversing the data structure.

13. The non-transitory, computer-readable storage medium of claim 10, wherein the operations further comprise, in response to addition of a particular node to the data structure based on user input:
automatically updating a metadata-based node using metadata specified by user input when adding the particular node, wherein the metadata-based node is accessible via the top-level node of the data structure.

14. The non-transitory, computer-readable storage medium of claim 10, wherein the indication of one or more possible paths to the given node includes an indication of a set of interior nodes included in each path and corresponding selectable links to navigate to ones of the set of interior nodes.

15. The non-transitory, computer-readable storage medium of claim 10, wherein the operations further comprise, in response to edits linking a particular node to an additional parent node:
adding a path indication for the particular node that corresponds to a path that includes the additional parent node.

16. A non-transitory, computer-readable storage medium storing program instructions that, when executed, are capable of causing a computer system to perform operations comprising:
accessing a data structure arranged as a directed acyclic graph (DAG) that includes a top-level node, a plurality of interior nodes, and a plurality of leaf nodes, wherein interior nodes of the plurality of interior nodes correspond to a category within a taxonomic hierarchy and point to other interior nodes or leaf nodes, and wherein leaf nodes of the plurality of leaf nodes have corresponding parent interior nodes and include links to one or more artifacts in an information repository; and
in response to user input to split a particular interior node within the taxonomic hierarchy of the DAG into two or more interior nodes, adding the two or more interior nodes to the DAG and modifying the particular interior node to include links to the two or more added interior nodes; and
wherein, subsequent to the split, an access to the particular interior node outputs information that is displayable by a user interface (UI) for the particular interior node, the UI including an indication that the particular interior node has been split into the two or more added interior nodes.

17. The non-transitory, computer-readable storage medium of claim 16, wherein user-specified changes to the taxonomic hierarchy of the DAG are implemented by maintaining a current set of interior nodes in the DAG while changing the content or nature of one or more of the interior nodes such that the user-specified changes appear to be implemented to a user traversing the DAG.

18. The non-transitory, computer-readable storage medium of claim 17, wherein the UI for the particular interior node includes:
indications of the two or more added interior nodes; and
corresponding selectable links to navigate to the two or more added interior nodes.

19. The non-transitory, computer-readable storage medium of claim 16, wherein the data structure is created and edited such that any nodes added by a user that descend from first-level interior nodes are either interior nodes or leaf nodes.

20. The non-transitory, computer-readable storage medium of claim 19, wherein the operations further comprise:
   in response to creation of new interior or leaf node within the data structure, automatically updating one or more metadata-based nodes in the data structure based on metadata supplied upon creation of the new node, wherein the one or more metadata-based nodes are accessible via the top-level node.

* * * * *